US009100466B2

(12) United States Patent
Yemdji et al.

(10) Patent No.: US 9,100,466 B2
(45) Date of Patent: Aug. 4, 2015

(54) METHOD FOR PROCESSING AN AUDIO SIGNAL AND AUDIO RECEIVING CIRCUIT

(71) Applicant: INTEL IP CORPORATION, Santa Clara, CA (US)

(72) Inventors: Christelle Yemdji, Antibes (FR); Ludovick Lepauloux, Cannes (FR); Christophe Beaugeant, Mouans Sartoux (FR); Nicholas Evans, Valbonne (FR)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 13/892,420

(22) Filed: May 13, 2013

(65) Prior Publication Data

US 2014/0334620 A1 Nov. 13, 2014

(51) Int. Cl.
*H04M 3/00* (2006.01)
*G10L 21/0232* (2013.01)
*G10L 21/0216* (2013.01)
*G10L 21/0208* (2013.01)
*H04B 3/23* (2006.01)
*H04M 9/08* (2006.01)
*H04B 3/20* (2006.01)
*H04R 3/02* (2006.01)

(52) U.S. Cl.
CPC ........... *H04M 3/002* (2013.01); *G10L 21/0232* (2013.01); *H04R 3/02* (2013.01); *G10L 2021/02082* (2013.01); *G10L 2021/02161* (2013.01); *H04B 3/234* (2013.01); *H04R 2410/05* (2013.01); *H04R 2499/11* (2013.01)

(58) Field of Classification Search
None
See application file for complete search history.

(56) References Cited

U.S. PATENT DOCUMENTS

| 6,597,787 | B1* | 7/2003 | Lindgren et al. | 379/406.05 |
|---|---|---|---|---|
| 2008/0262835 | A1* | 10/2008 | Oshikiri | 704/205 |
| 2009/0238373 | A1* | 9/2009 | Klein | 381/66 |
| 2011/0125497 | A1 | 5/2011 | Unno | |
| 2012/0027218 | A1* | 2/2012 | Every et al. | 381/66 |
| 2012/0307980 | A1* | 12/2012 | Krishnaswany | 379/3 |
| 2014/0162731 | A1* | 6/2014 | Helsloot et al. | 455/570 |

OTHER PUBLICATIONS

Kuttruff, Heinrich, "Room Acoustics", Fifth edition, Spon Press, 2009, 389 pages.
Haykin, Simon, "Adaptive Filter Theory", Prentice Hall Information and System Sciences Series, pp. 327-331.
Hansler et al., "Acoustic Echo and Noise Control: A Practical Approach", Wiley Series in Adaptive and Learning Systems for Signal Processing, Communication, and Control, 2004, Sections 3.2.1, 10.1 and 10.2.
ITU-T, recommendation G.131: Talker echo and its control", Series G: Transmission Systems and Media, Digital Systems and Networks", 2003, 18 pages.
Yemdji et al., "Efficient Low Delay Filtering for Residual Echo Suppression," in European Signal Processing Conference (EUSIPCO), Aalborg, Denmark, 2010, 5 pages.

(Continued)

*Primary Examiner* — Fan Tsang
*Assistant Examiner* — Jeffrey Lytle

(57) ABSTRACT

A method for processing an audio signal is described comprising receiving a first audio signal via a first receiving path comprising a first microphone; receiving a second audio signal via a second receiving path comprising a second microphone; and performing echo suppression of the first audio signal based on the first audio signal and the second audio signal.

17 Claims, 13 Drawing Sheets

(56) References Cited

OTHER PUBLICATIONS

Jeub et al., "Robust Dual-Channel Noise Power Spectral Density Estimation," 19th European Signal Processing Conference (EUSIPCO), Barcelona, Spain, 2011, pp. 2304-2308.

Yemdji et al., "Dual Channel Echo Postfiltering for Hands-free Mobile Terminals", International Workshop on Acoustic Signal Enhacement (IWAENC), Aachen, Germany, Sep. 2012, 4 pages.

Gannot et al., "Signal Enhancement Using Beamforming and Nonstationarity with Applications to Speech," IEEE Transaction on signal processing, vol. 49, No. 8, Aug 2001, pp. 1614-1626.

Shalvi et al., "System Identification Using Nonstationary Signals," IEEE Transactions on signal processing, vol. 44, No. 8, Aug. 1996, pp. 2055-2063.

ITU-T, Recommendation P.340: Transmission characteristics of hands-free telephones, Series P: Telephone Transmission Quality Subscribers' lines and sets, 1996, 27 pages.

Gannot et al., "Adaptive Beamforming and Postfiltering," in Springer Handbook of speech processing, Springer, 2008, pp. 945-978.

Reuven et al., "Joint Noise Reduction and Acoustic Echo Cancellation Using the Transfer-Function Generalized Sidelobe Canceller" in Speech communication, vol. 49, 2007, pp. 623-635.

European Search Report in the corresponding European Patent Application No. EP14167859.9, mailed on Mar. 13, 2015, 5 pages.

* cited by examiner

METHOD FOR PROCESSING AN AUDIO SIGNAL AND AUDIO RECEIVING CIRCUIT

TECHNICAL FIELD

The present disclosure relates to a method for processing an audio signal and an audio receiving circuit.

BACKGROUND

In physics, echo may be defined as the replica produced by the reflection of a wave in its surrounding environment. Such a phenomenon may occur in speech telecommunications. In a telephone terminal, acoustic echo is due to the coupling between the loudspeaker and the microphone of the terminals. As a consequence, the microphone of the telephone not only contains the useful speech signal but also contains echo. If no processing is done on the microphone path, the echo signal as well as the near-end speech signals is transmitted to the far-end speaker and the far-end speaker hears a delayed version of his/her own voice. The annoyance due to hearing his/her own voice increases as the level of the echo signal is high and as the delay between the original signal and its echo is high.

In order to guarantee a good speech quality, some processing may be implemented on the microphone path before the transmission can take place. Acoustic echo cancellation algorithms have been largely investigated in the recent years. Approaches to acoustic echo cancellation may include an adaptive filter followed by an echo postfilter. The adaptive filter produces a replica of the acoustic path. This echo path estimate is then used to estimate the echo signal that is picked up by the microphone. In practice, performance of adaptive echo cancellation (AEC) is disturbed by the presence of ambient noise or/and near-end speech signal. To limit the impact of such disturbance on the AEC, double-talk detectors (DTD) and/or noise only detectors may be used.

Double talk detectors may typically be quite complex. Scenario classification algorithms may for example exploit speech presence probability and/or signal coherence. Typical use of DTD consists in freezing the adaptation of the AEC during double-talk (DT) periods (double-talk periods refer to periods during which both the far-end and near-end speakers are active). Nevertheless even with the use of DTD, some residual echo typically subsists at the output of the adaptive filter. A postfilter may be used to render echo inaudible. Echo postfilters may consist of attenuation gain applied to the error signal from the adaptive echo cancelling. For better double talk performances, this attenuation can be computed in the subband or frequency domain. Nevertheless, performances of single channel echo cancellation are still limited especially in a handsfree configuration, for which the near end to echo ratio is low. This limited performance may result in high distortions in the processed near-end speech signals during double-talk periods and therefore in bad communications quality. There may be a trade-off to be made between echo suppression during echo-only periods and low level distortion of near-end speech during DT periods. Approaches to improve the speech quality in case of low near-end to echo ratio may be based on the use of multi microphones for echo processing.

Further, multi-channel echo cancellation based on beamforming approaches may be used in order to improve the speech quality in case of low near-end to echo ratio.

Still, effective methods of echo postfiltering or echo suppression are desirable.

SUMMARY

A method for processing an audio signal is provided including receiving a first audio signal via a first receiving path including a first microphone; receiving a second audio signal via a second receiving path including a second microphone; and performing echo suppression of the first audio signal based on the first audio signal and the second audio signal.

Further, an audio receiving circuit according to the above method for processing an audio signal is provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Approaches to improve speech quality in mobile terminals may include the use of multi-microphone terminals. Multi-microphone terminals implicitly provide spatial information on the near-end acoustic environment. For example, the observation of microphone signals from a dual-microphone mobile terminal shows that there is a clear level difference according to whether there is currently an echo-only, a double-talk or a near-end only period.

As described further below, this level difference may be exploited for improved echo cancellation purposes.

Figure 1:
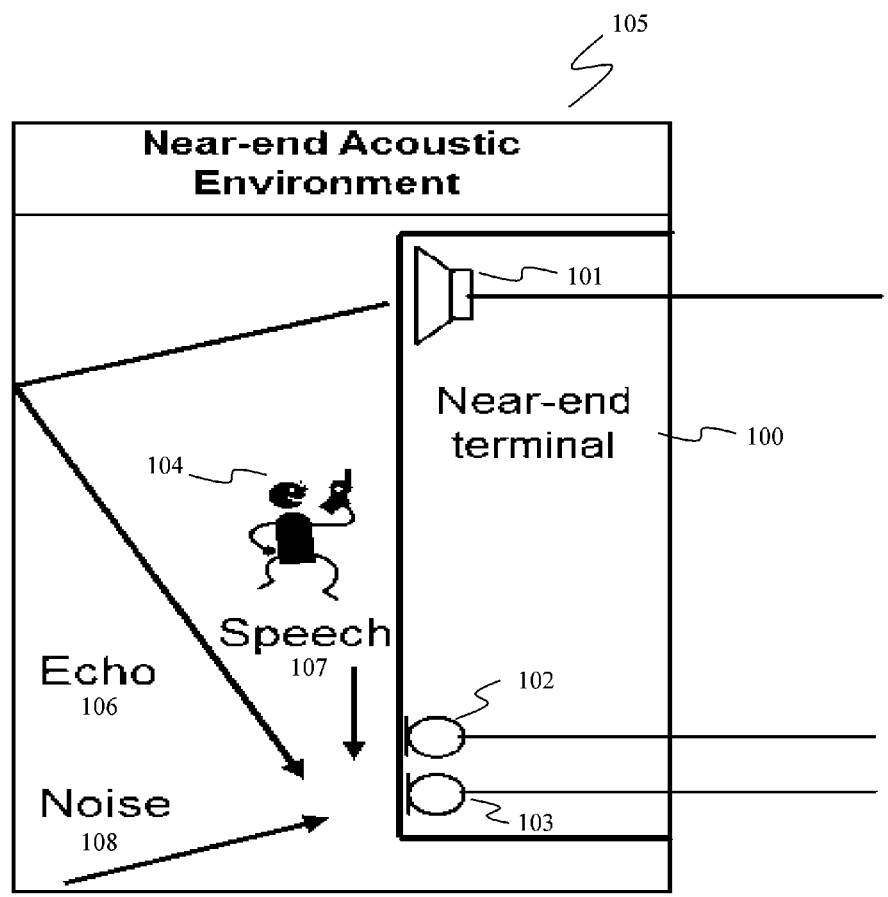
FIG. 1 shows an example of a terminal equipped with one loudspeaker and two microphones.

FIG. 1 shows an example of a terminal 100 equipped with one loudspeaker 101 and two microphones 102, 103.

The term "loadspeaker" may refer to both an earpiece and a hands-free loadspeaker.

One of the microphone observations may be considered as the primary observation and the other as secondary observation. As shown in FIG. 1, the far-end speaker voice is played by the loudspeaker 101 to the near-end speaker 104. Part of this loudspeaker signal may reflect in the near-end environment 105 and may be later on picked up by both microphones 102, 103 as an echo 106. The coupling between the loudspeaker 101 and each microphone may define one acoustic path: two acoustic paths for the two microphones 102, 103. Each microphone 102, 103 (with possible subsequent processing components) forms a receiving path.

The microphones 102, 103 may record the near-end speaker voice or speech signal 107 and eventually the background noise 108. The near-end speaker voice 107 may also reflect in the environment 105 before being picked up by the microphones 102, 103. Because both microphones 102, 103 may not necessarily be placed at the same position, the acoustic path between the near-end speaker and each microphone may have to be modeled. It should be appreciated that FIG. 1 does not present a limiting example of the microphones' positions and the microphones 102, 103 may be put differently on the terminal 100.

Figure 2:
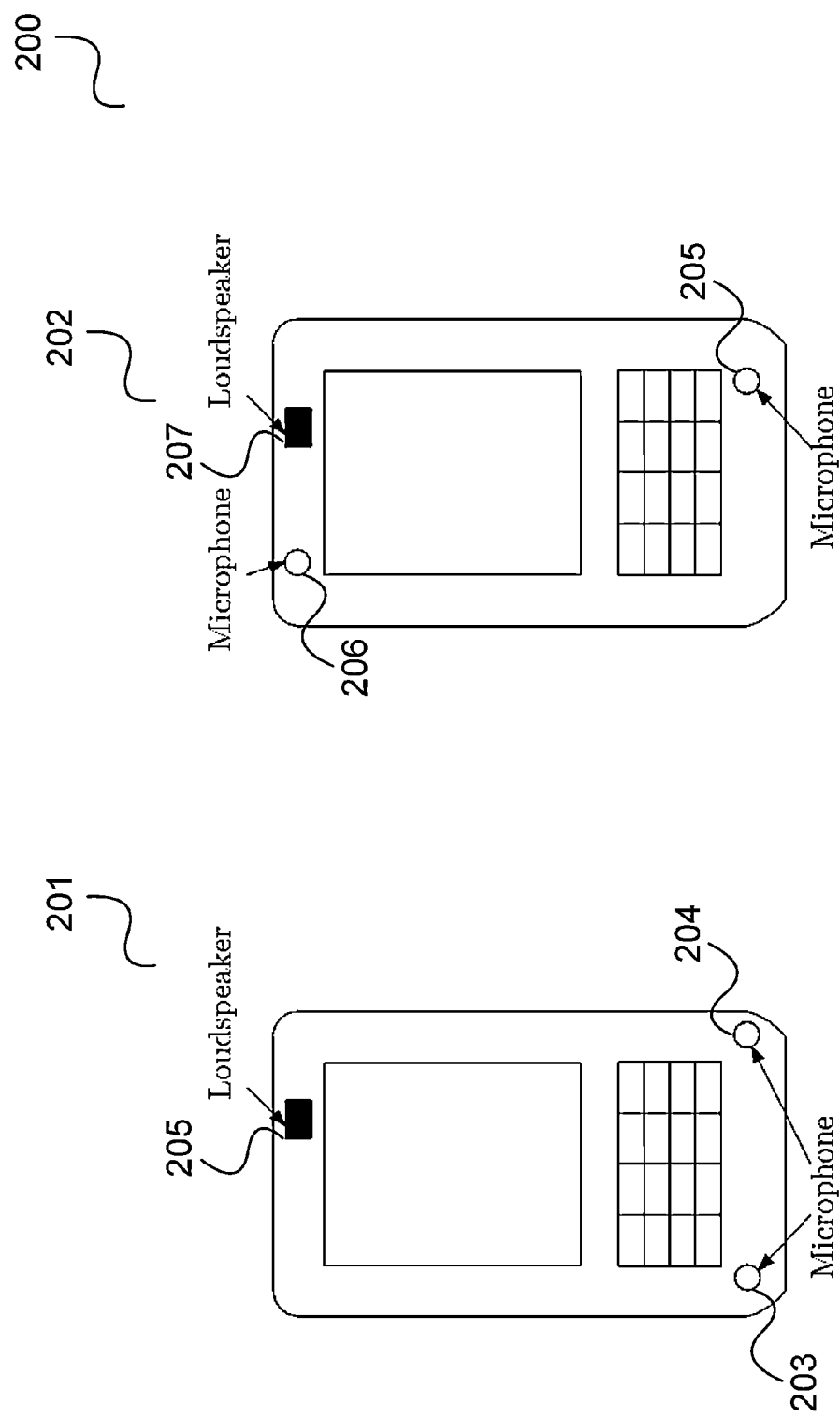
FIG. 2 shows mobile terminals with examples for transducer configurations.

Examples for the positioning of the transducers are given in FIG. 2. The term transducers refers to both the loudspeaker and the microphones.

FIG. 2 shows mobile terminals 201, 202.

The first mobile terminal 201 has a bottom-bottom configuration in which the microphones 203, 204 are both placed at the bottom of the phone and are approximately equidistant from the loudspeaker 205.

The second mobile terminal 202 has a the bottom-top configuration in which the microphones 205, 206 are placed such that one is pretty close to the loudspeaker 207 and the other one is quite far from the loudspeaker 207.

In the bottom-top configuration, the microphone 206 closer to the loudspeaker 207 is referred to as the secondary microphone while the one further from the loudspeaker is referred to as the primary microphone. It should be noted that the secondary microphone and/or the primary microphone may also be arranged at the back side of the mobile terminal 202. Further, a hands-free loudspeaker may be arranged at the back side of the mobile terminals 201, 202.

The mobile terminals 201, 202 may be telecommunication terminals equipped with one loudspeaker and two or more microphones.

Further, the following functionalities and approaches may also be applied to other communication devices such as laptop or tablet computers which may also experience echo.

Figure 3:
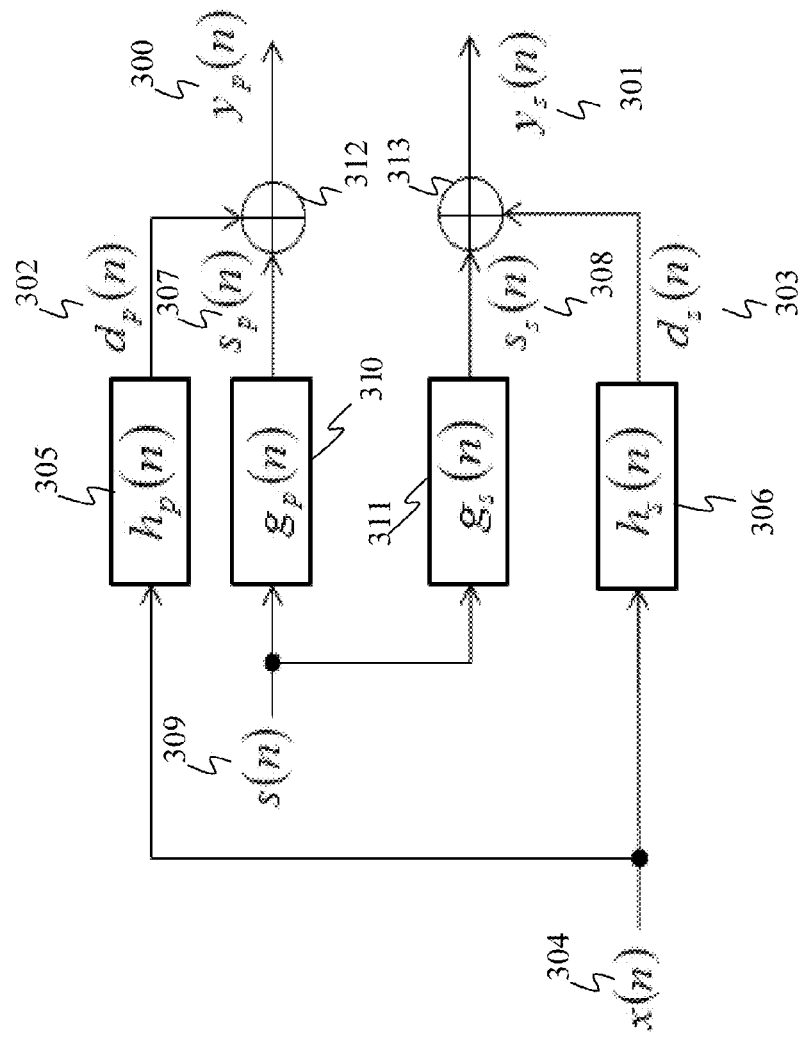
FIG. 3 shows a schematic representation of a signal model matching the physical interactions between the acoustic sources and the transducers of the system as described in FIG. 1.

The signal model of the dual channel (DC) echo problem is illustrated in FIG. 3.

FIG. 3 shows a schematic representation of a signal model matching the physical interactions between the acoustic sources and the transducers of the system as described in FIG. 1, illustrating how the primary and secondary microphone signals can be modeled.

The primary and secondary microphone signals 300, 301 are provided by the microphones 102, 103 and are denoted $y_p(n)$ and $y_s(n)$ respectively. The signals $d_p(n)$ 302 and $d_s(n)$ 303 represent the echo signal picked up by the primary and secondary microphone 102, 103 respectively. Both are generated by the loudspeaker signal x(n) 304 of the loudspeaker 101 where $h_{p|s}(n)$ are represented by convolutive blocks 305, 306 accounting for the acoustic path between the loudspeaker 101 and respective microphones 102, 103.

The signals $s_p(n)$ 307 and $s_s(n)$ 308 represent the near-end speech signal picked up by the primary microphone 102 and the secondary microphone 103 respectively. Both are generated by the near-end speech signals(n) 309 (or 107), where $g_{p|s}(n)$ are represented by convolutive blocks 310, 311 accounting for the acoustic path between the near-end speaker 104 and the primary or secondary microphone 102, 103.

The primary microphone signal $y_p(n)$ 300 is given by the sum, provided by summing block 312, of $s_p(n)$ 307 and $d_p(n)$ 302. The secondary microphone signal $y_s(n)$ 301 is given by the sum, provided by summing block 313, of $s_s(n)$ 308 and $d_s(n)$ 303.

In respect with signal model in FIG. 3, the following equations may be derived:

$$y_p(n)=g_p(n)*s(n)+h_p(n)*x(n)$$

$$y_s(n)=g_s(n)*s(n)+h_s(n)*x(n) \quad \text{Eq (1)}$$

where:
x(n) is the loudspeaker signal 304,
$y_{p|s}(n)$ represents the primary or secondary microphone signals 300, 301 respectively. They include an echo signal and a near-end speech signal.
$h_{p|s}(n)$ 305, 306 represents the acoustic path between the loudspeaker 101 and the primary or secondary microphone 102, 103
s(n) 309 is the near-end speaker signal
$g_{p|s}(n)$ 310, 311 represents the acoustic path between the near-end speaker 104 and the primary or secondary microphone 102, 103
* represents the convolution operation.

It should be noted that in the following, also the indexes 1, 2 are used instead of p, s (both as superscript as well as subscript, both uses denoting the reference to the primary and secondary microphone or receiving path, respectively).

In order to validate the signal model illustrated in FIG. 3, an analysis of signals recorded with dual-microphone devices for both handset and handsfree modes may be performed. Recording from mobile devices is compared to that from a mock-up phone for verification and validation of the signal model.

The analysis of the recording allows studying the level difference between the microphone signals. The level of a signal can be measured as its amplitude, energy or power. In the following, the power spectral density is used. In the following, the primary microphone refers to the microphone which is placed further from the loudspeaker i.e. with less power during echo-only periods. The power spectral density of the primary and secondary microphone will respectively be denoted $\Phi^{y_1 y_1}(k,i)$ and $\Phi^{y_2 y_2}(k,i)$. The indexes k and i respectively represent the frame and frequency bin indexes.

Handsfree Case

In the following, results of measurements of impulse responses with a mock-up phone in different acoustic environments (cabin, office, meeting room) are shown. The mock-up phone is equipped with one loudspeaker and two microphones. The microphones are placed at opposite corners of the phone. The loudspeaker was placed slightly closer to one of the microphones. An artificial head with mouth simulator was used to simulate the near-end speaker. Two different positions for the phone have been used: one where the phone is placed at 30 cm straight in front of the artificial head's mouth and another where the phone is placed on a table. In all recordings, the phone was placed such that the two microphones of the phone are approximately at equal distance of the artificial mouth.

Figure 4:
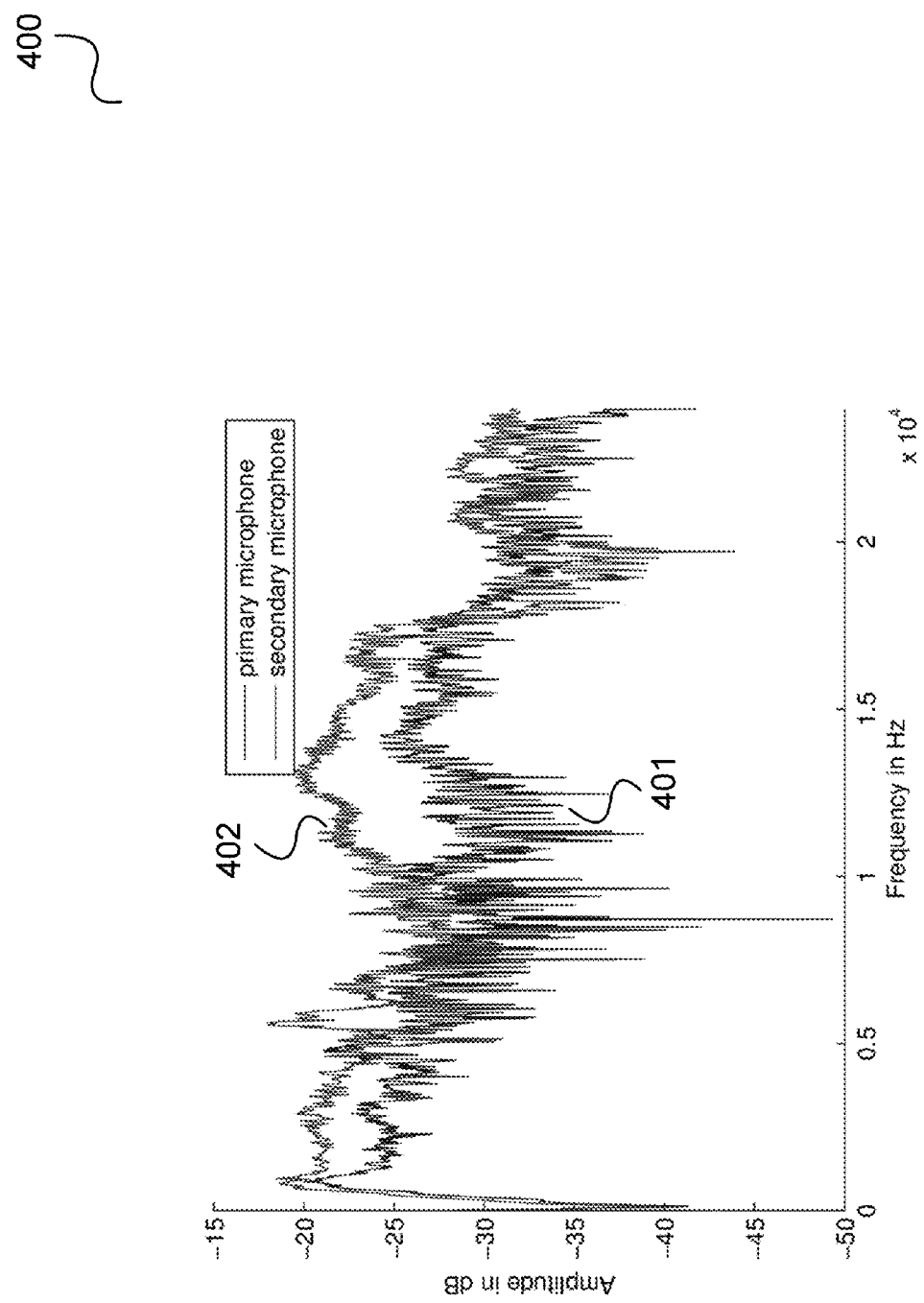
FIG. 4 shows the frequency response of the acoustic path between the loudspeaker and the microphones according to an exemplary measurement performed in HF (handsfree) mode.

FIG. 4 shows the frequency response of the acoustic path between the loudspeaker and the microphones according to an exemplary measurement in a first graph 401 for the primary microphone and a second graph 402 for the second microphone. It can be seen that the loudspeaker signal received by the microphones is not equally attenuated by the acoustic environment for each microphone. This implies that during echo-only periods the power of the signal on the secondary microphone will be superior to that on the primary microphone.

Figure 5:
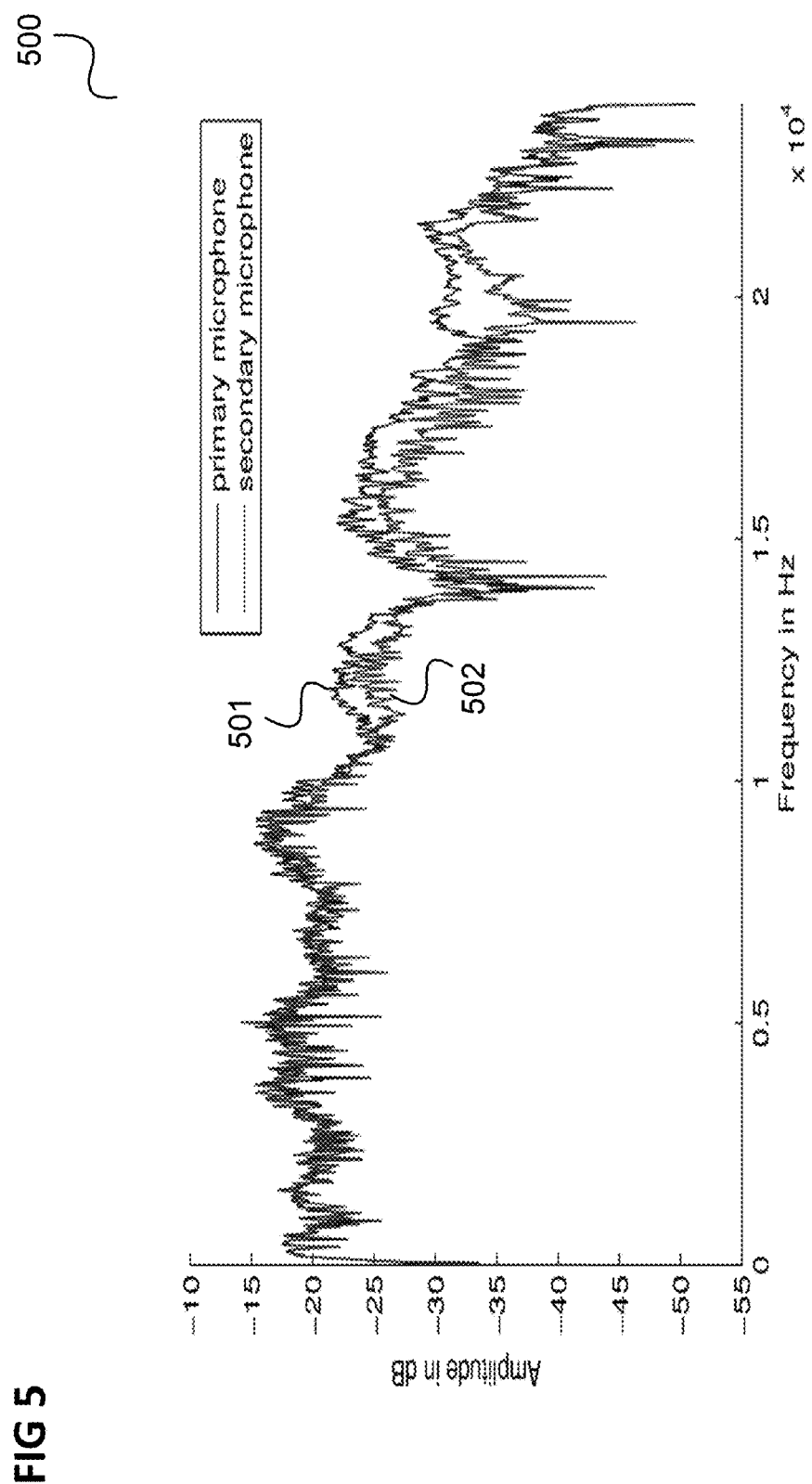
FIG. 5 shows the frequency response between the artificial head's mouth and the microphones according to an exemplary measurement performed in HF mode.

FIG. 5 shows the frequency response between the artificial head's mouth and the microphones according to an exemplary measurement in a first graph 501 for the primary microphone and a second graph 502 for the second microphone. It can be seen that both frequency responses are very similar. These similarities can be explained by the position of the microphones compared to the artificial head mouth. FIG. 4 and FIG. 5 together show that:

During echo-only periods, the PSD of the signal on the primary microphone is lower than that on secondary microphone $$\Phi^{y_1 y_1}(k,i) << \Phi^{y_2 y_2}(k,i) \qquad \text{Eq (2)}$$

During near-end only periods, the PSD of the both microphone signals is approximately equal $$\Phi^{y_1 y_1}(k,i) \approx \Phi^{y_2 y_2}(k,i) \qquad \text{Eq (3)}$$

By interpolating, it can be stated that during double-talk periods, the primary microphone power will be lower than that of the secondary. Nevertheless the power level difference (PLD) observed in double-talk situations will be less significant than that observed in echo-only.

As above, k is a time or frame index and i is a frequency index.

In the following, the behavior of microphone signals in handset position is discussed. For this, a mobile phone having one loudspeaker and two microphones which are placed at the opposite corner of the terminal as in case of the of the mobile terminal 201 is considered.

Figure 6:
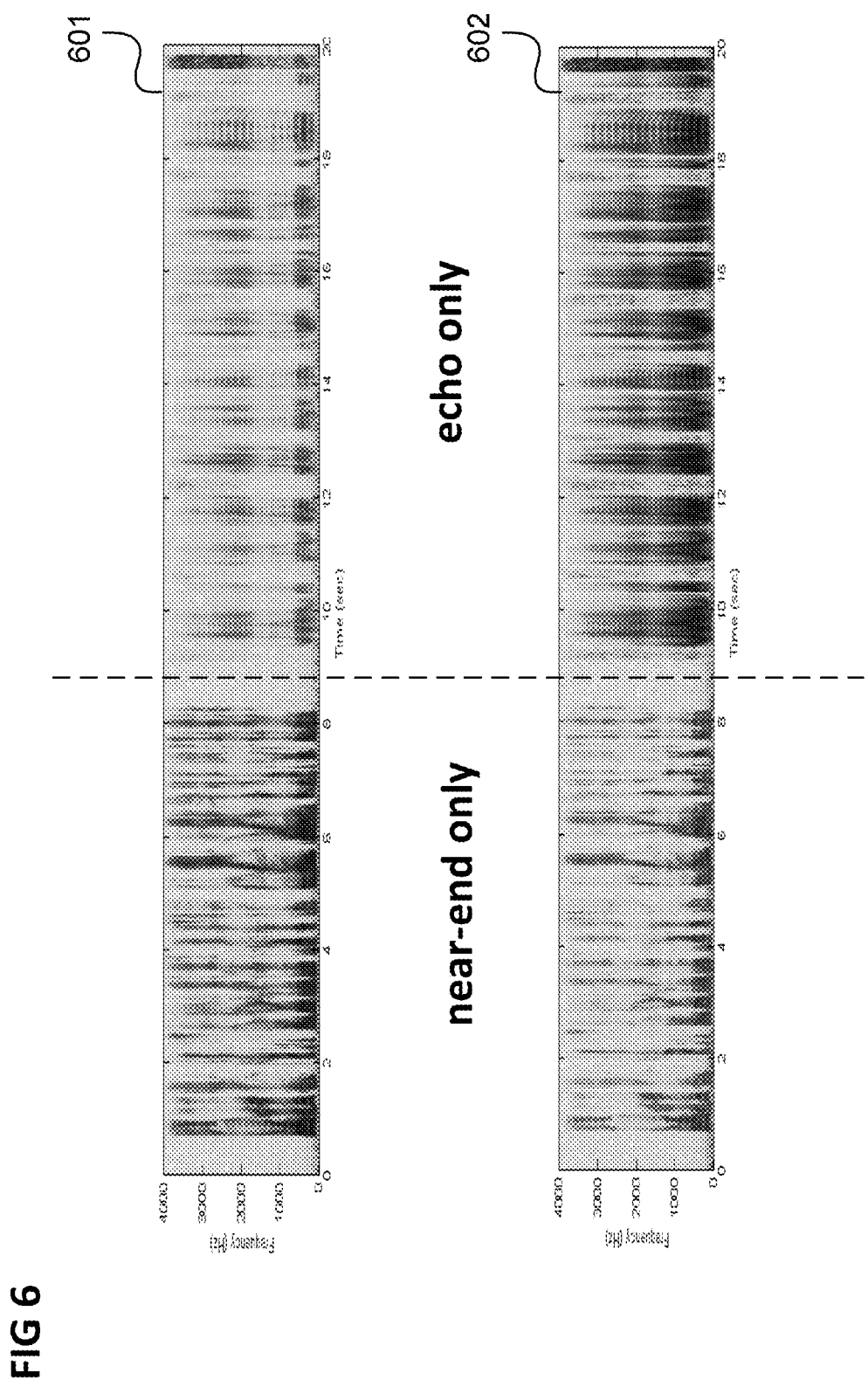
FIG. 6 shows spectrograms of microphone signals recorded in an exemplary scenario in HF mode.

FIG. 6 shows spectrograms 601, 602 of microphone signals recorded in such a scenario.

High intensity points indicate high energy: the darker the color is, the higher the power at that point is. The microphone signals illustrated in FIG. 6 is composed of a near-end only period (from 0 to ~9 s) followed by an echo-only period (~9 s to the end). Based on the spectrograms 601, 602, the following can be seen:

During near-end only periods, the PSD of the signal on the primary microphone is very high compared to that on the secondary microphone $$\Phi^{y_1 y_1}(k,i) >> \Phi^{y_2 y_2}(k,i) \qquad \text{Eq (4)}$$

The PSD of the signal on the primary microphone is lower than that on secondary microphone during echo-only periods $$\Phi^{y_1 y_1}(k,i) << \Phi^{y_2 y_2}(k,i) \qquad \text{Eq (5)}$$

By interpolating, it can be seen that during double-talk periods, the PSD of the primary microphone is lower than that of the secondary microphone. Nevertheless, the difference observed in double-talk situations is less significant than that observed in echo-only.

From the analysis of the microphone signals, it can be seen that for both handsfree and handset scenarios $$\Phi^{y_1 y_1}(k,i) << \Phi^{y_2 y_2}(k,i) \qquad \text{Eq (6)}$$

in echo only periods. This PSD difference is mainly due to the position of the microphone on the terminal and is not very much dependent of the acoustic environment. Indeed, as far as a terminal equipped with two microphones with transducers placed in bottom-top configuration is used, the level of the primary microphone will always be lower to that of the secondary microphone in echo only periods. Positioning the transducers in bottom-top configuration can be seen as a constraint introduced in the mobile design but yet this constraint still leaves the designer some degree of freedom.

So, for a bottom-top configuration of the microphones the following different scenarios can be observed:

Echo-only: the loudspeaker which is the source here, is close to the secondary microphone. It results that the secondary microphone level is higher than that of primary microphone. This is true for both handset and handsfree.

Near-end only:
  Handset: the mouth of the near-end speaker is near the primary microphone. As result, the primary microphone level is higher than that of the secondary microphone
  Handsfree: the near-end mouth is far from both microphones and can be assumed to be at equal distance from the microphones. Typically, both microphones have equivalent level. However, due to the proximity of the HF loudspeaker and the secondary microphone the secondary microphone level is higher than the primary microphone level during an echo-only period.

Double-talk: by extrapolating from the echo-only and near-end only power difference, it can be concluded that during DT depending on the signal to echo ratio and on whether the communication terminal is handsfree or handset configuration, there is a level difference between the two microphones. However, because of the presence of near-end speech, the power difference observed during DT will not be as extreme as that observed in echo-only.

In the following, a method for processing an audio signal is described that may for example perform an echo suppression based on the above-described power difference. For example, a DT detection rule or an echo suppression gain rule may be used which is based on the power difference of different microphones. The above approach can be seen to be hardware-based as mainly taking benefit of the microphones' positions on the communication terminal.

Figure 7:
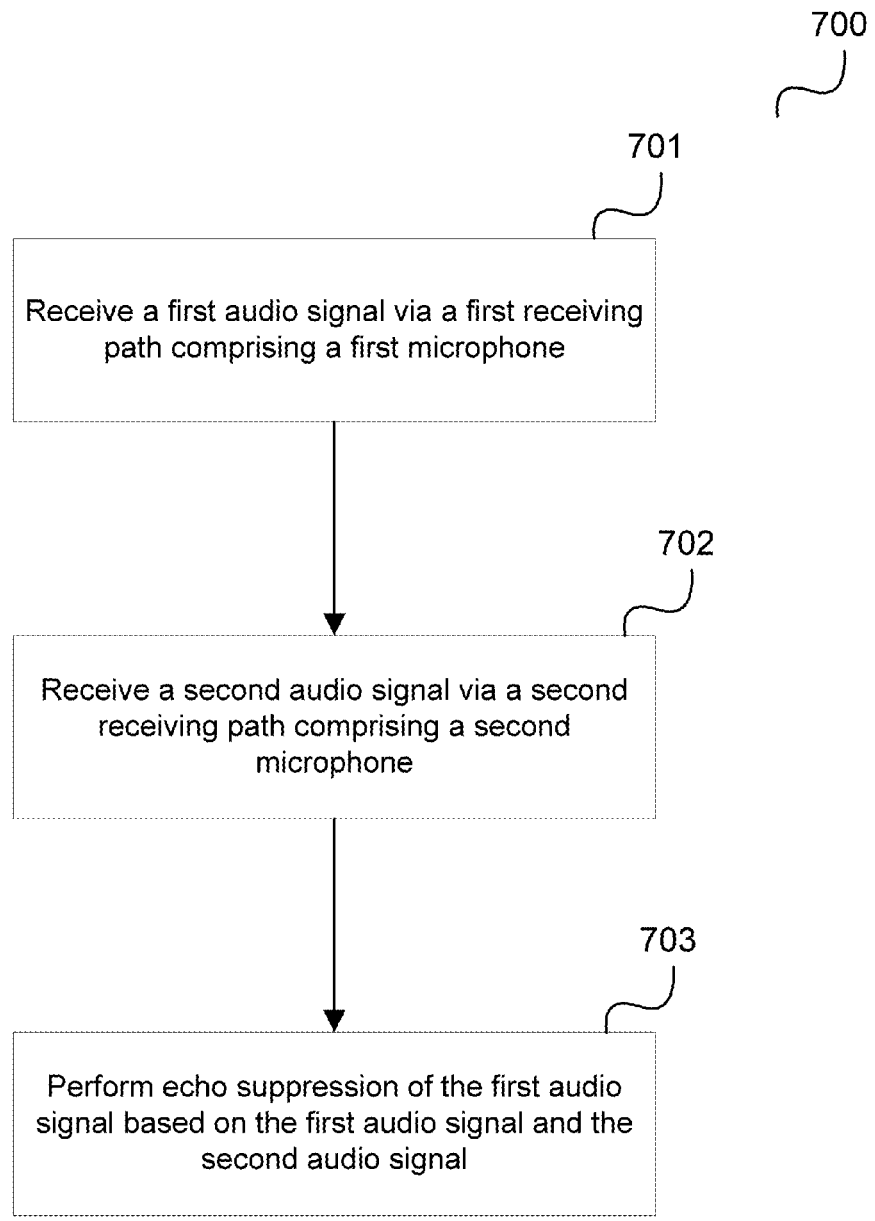
FIG. 7 shows a flow diagram illustrating a method for processing an audio signal.

FIG. 7 shows a flow diagram 700.

The flow diagram 700 illustrates a method for processing an audio signal, for example carried out by an audio processing circuit.

In 701, the audio receiving circuit receives a first audio signal via a first receiving path including a first microphone.

In 702, the audio receiving circuit receives a second audio signal via a second receiving path including a second microphone.

In 703, the audio receiving circuit performs echo suppression of the first audio signal based on the first audio signal and the second audio signal.

In other words, echo suppression or cancellation for an audio signal is performed based on the two versions of the audio signal as received via different receiving paths, e.g. by means of different microphones. For example, double talk detection and/or an echo suppression rule may be based on the audio signals received via the two receiving paths, e.g. on a power level difference of these signals.

In other words, the level difference between the different microphones may be exploited. The level of a signal can be measured or computed as its energy amplitude or power. For example, the microphone signal power spectrum density (PSD) may be used as signal level but the signals energy may also be used. The PSDs of the primary microphone and secondary microphones are in the examples below denoted $\Phi^{y_1 y_1}(k,i)$ and $\Phi^{y_2 y_2}(k,i)$ respectively where k and i respectively represent the frame and frequency bin indexes.

The first audio signal and the second audio signals may each include a combination of a desired audio signal (e.g. a speech input), an output signal (e.g. a loudspeaker signal) and noise. The signal resulting from the echo suppression of the first audio signal may have echoes (e.g. from the output signal) being suppressed and may be similar to the desired signal.

The method may further include receiving the one or more further audio signals via one or more further receiving paths (e.g. one further audio signal per further receiving path) and performing echo suppression of the first audio signal based on the first audio signal, the second audio signal and the one or more further audio signals.

For example, each further receiving path includes a further microphone.

Figure 8:
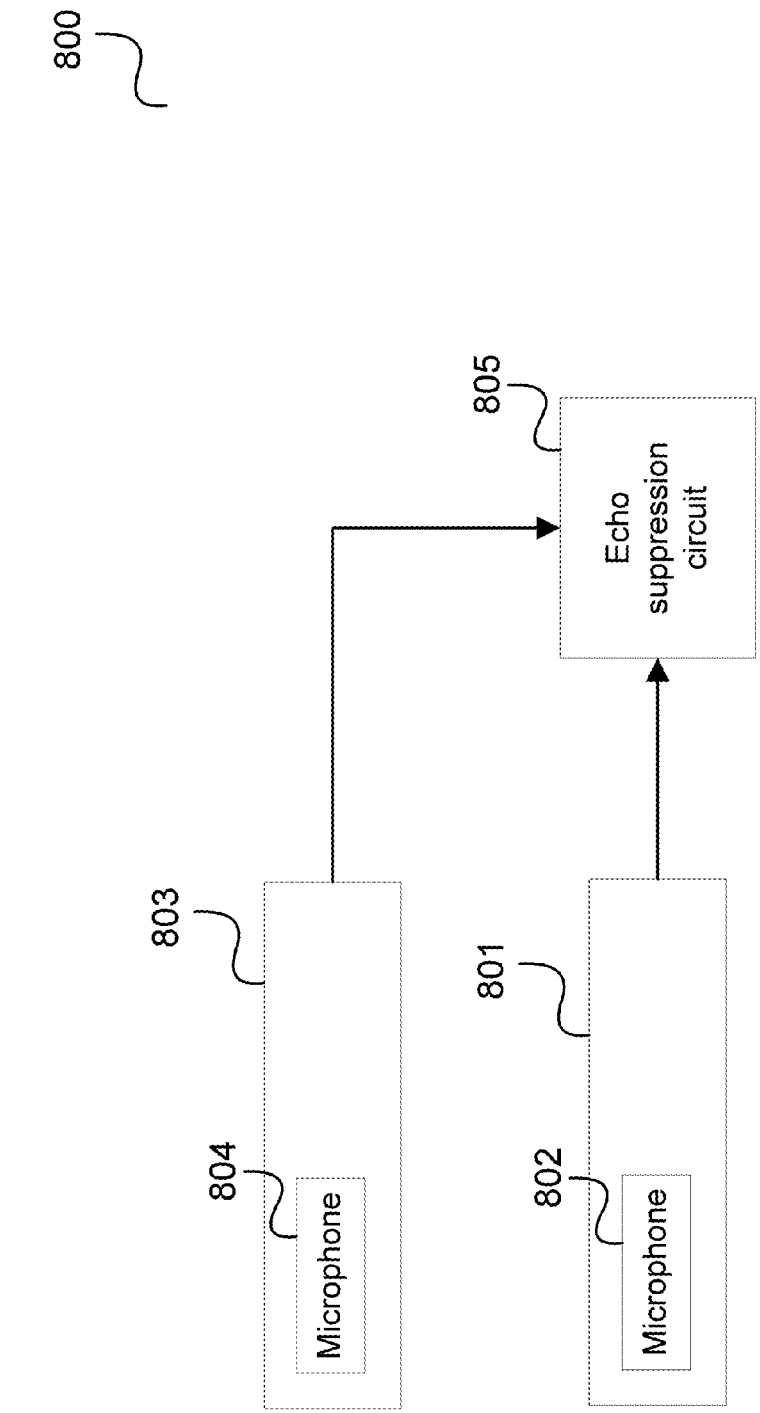
FIG. 8 shows an audio receiving circuit.

The microphones are for example part of the same communication device (e.g. housing the audio processing circuit, e.g. the audio processing circuit 800 as illustrated in FIG. 8).

Performing echo suppression of the first audio signal based on the first audio signal and the second audio signal may include determining an echo suppression gain based on the first audio signal and the second audio signal and performing echo suppression of the first audio signal based on the determined echo suppression gain.

The method may include performing echo suppression of the first audio signal based on a comparison of the first audio signal with the second audio signal.

For example, the method includes determining a value representing a level difference between the first audio signal and the second audio signal and performing echo suppression of the first audio signal based on the value.

The level difference is for example a power level difference, a voltage level difference or an energy level difference.

The method may include comparing the level difference with a threshold and performing the echo suppression of the first audio signal based on the result of the comparison.

The method may include detecting a double-talk scenario based on the result of the comparison.

Performing echo suppression for example includes adaptive echo filtering.

Performing echo suppression of the first audio signal based on the first audio signal and the second audio signal for example includes setting the adaptation of the echo filtering based on the first audio signal and the second audio signal.

Performing echo suppression for example includes echo postfiltering.

Performing echo suppression of the first audio signal based on the first audio signal and the second audio signal may for example include determining filter coefficients based on the second audio signal and filtering the first audio signal using the filter coefficients.

Performing echo suppression based on the first audio signal and the second audio signal may for example include determining an echo suppression gain based on the first received audio signal and the second received audio signal and filtering echo suppression based on the first received audio signal and the echo suppression gain.

The method illustrated in FIG. 7 is for example carried out by a audio receiving circuit (which is for example part of a communication device such as a mobile terminal) as illustrated in FIG. 8.

FIG. 8 shows an audio receiving circuit 800.

The audio receiving circuit 800 includes a first receiving path 801 including a first microphone 802 configured to receive a first audio signal and a second receiving path 802 including a second microphone 804 configured to receive a second audio signal.

The audio receiving circuit 800 further includes an echo suppression circuit 805 configured to perform echo suppression of the first audio signal based on the first audio signal and the second audio signal.

It should be noted that embodiments described in context of the method for processing an audio signal illustrated in FIG. 7 are analogously valid for the audio receiving circuit 800 and vice versa.

The components of the audio receiving circuit (e.g. the receiving paths and the echo suppression circuit) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program. Any other kind of implementation of the respective functions which will be described in more detail below may also be understood as a "circuit".

Figure 9:
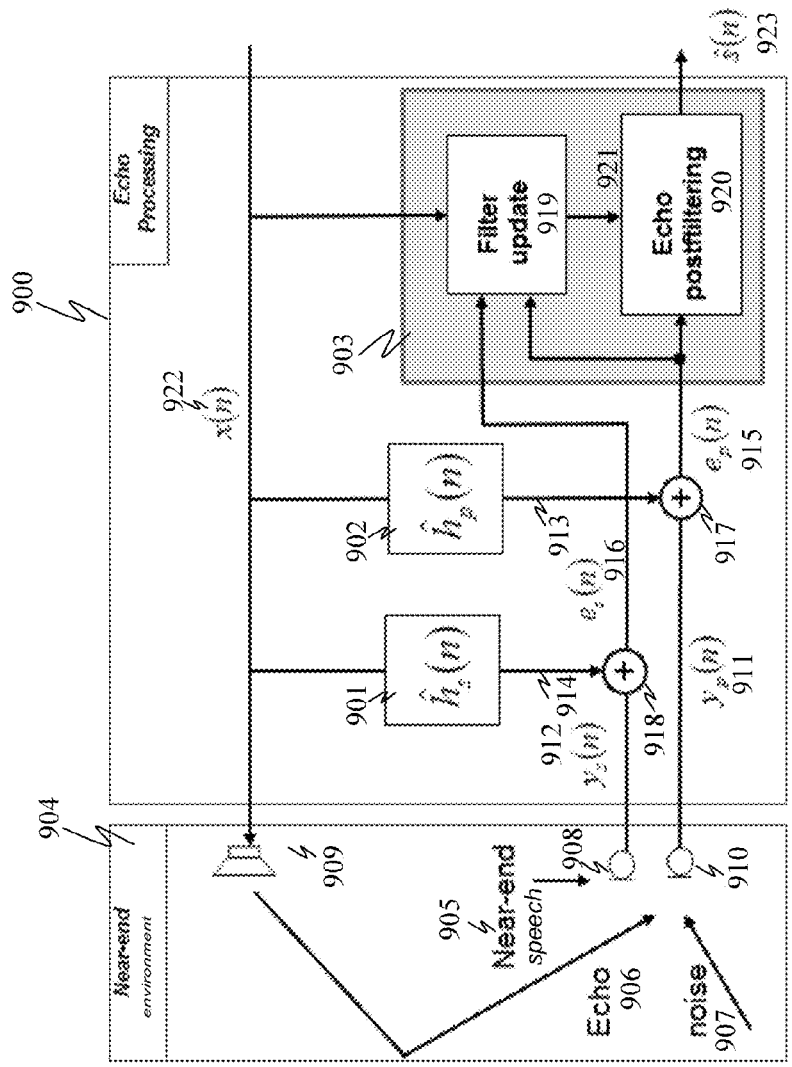
FIG. 9 shows an echo cancellation (or suppression/processing) circuit including an adaptive filter part, which includes one adaptive filter followed by an echo postfilter.

In the following, examples for echo cancellation in dual-channel terminals according to the method illustrated in FIG. 7 are given. In the following examples, echo cancellation is composed of adaptive filtering followed by echo postfiltering as illustrated in FIG. 9. The choice and position of each echo cancellation module is explained in the following.

FIG. 9 shows an echo cancellation (or echo suppression) circuit 900.

The echo cancellation circuit 900 includes an adaptive filter part, which includes two adaptive filters 901, 902 (one adaptive filter per microphone path), followed by an echo postfilter 903.

The echo cancellation circuit 900 processes audio signals received from a system 904 of acoustic sources (i.e. near-end speech 905, noise 907, loudspeaker 909 signal giving rise to echo 906) and transducers (i.e. loudspeaker 909 and two microphones 908, 910). The system 904 may correspond to the system 100 of FIG. 1 and may be represented by the signal model as illustrated in FIG. 3.

For each microphone 908, 910, the effect of echo may be considered to be the same as in a SC echo cancellation. Therefore for each microphone signal $y_{p|s}(n)$ 911, 912, an estimate of the echo signal 913, 914 may be obtained by the use of an adaptive filter 901, 902 as in the SC case.

It should be noted that any adaptive echo cancellation process may be applied, e.g. any adaptive echo cancellation algorithm. For example, an LMS (least mean square) or NLMS (normalized LMS) algorithm may be used to estimate the echo signals.

For the same reasons that in the SC case, some residual echo may be present in the error signals $e_{p|s}(n)$ 915, 916 at the output of the acoustic echo cancellations (AECs). The error signal $e_{p|s}(n)$ 915, 916 may be obtained by the difference, provided by respective summing blocks 917, 918, between the microphone signals $y_{p|s}(n)$ 911, 912 and the respective estimates of the echo signals 913, 914. The postfilter 903 may be used to achieve further echo suppression. The postfilter 903 may include a filter update block 919 and an echo postfiltering block 920. The filter update block 919 produces an output 921 based on $e_{p|s}(n)$ 915, 916 and the loudspeaker signal x(n) 922 of the loudspeaker 909. For example in FIG. 9, this output 921 and $e_p(n)$ 915 are input into the echo postfiltering block 920 to give an echo suppressed signal $\hat{s}_p(n)$ (or $\hat{s}_1(n)$) 923.

The circuit 900 may be seen as an example of the audio receiving circuit 800 of FIG. 8.

Figure 10:
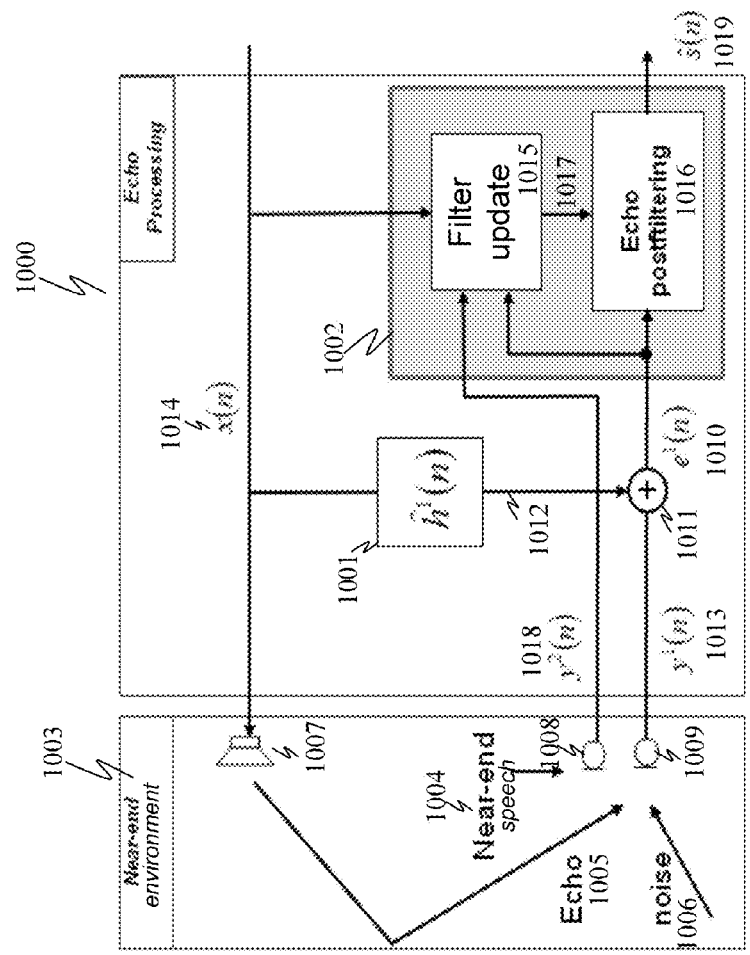
FIG. 10 shows an echo cancellation circuit including an adaptive filter part, which includes one adaptive filter followed by an echo postfilter.

In the examples described in the following, DC echo processing is used such as to output an estimate of the near-end speech signal with an echo postfilter which is solely applied to one microphone path. AEC demands a lot of memory and high computational capacity. Accordingly, the computational complexity of the circuit 800 may be reduced by using one AEC instead of two. This is illustrated in FIG. 10, where the secondary microphone is directly input to the echo postfilter. In this way, the computational complexity can be kept low.

FIG. 10 shows an echo cancellation circuit 1000 including an adaptive filter part, which includes one adaptive filter 1001, followed by an echo postfilter 1002.

The circuit 1000 processes audio signals with echo cancellation using only one adaptive echo filter. The circuit 1000 receives audio signals from a system 1003 of acoustic sources (i.e. near-end speech 1004, loudspeaker 1007 signal and noise 1006) and transducers (i.e. loudspeaker 1007 and two microphones 1008, 1009). The system 1003 may correspond to the system 100 of figure and may be represented by the signal model as illustrated in FIG. 3.

In FIG. 10, the error signal $e^1(n)$ 1010 may be obtained by the difference, provided by a summing block 1011, between the primary microphone signal $y^1(n)$ 1013 and an estimate of the echo signal 1012. The estimate of the echo signal 1012 may be obtained by having the loudspeaker signal x(n) 1014 going through the adaptive filter 1001. The postfilter 1002 may be used to achieve further echo suppression. The postfilter 1002 may include filter update block 1015 and an echo postfiltering block 1016. The filter update block 1015 produces an output 1017 (e.g. an echo postfiltering gain W(k,i)) based on $e^1(n)$ 1010, the secondary microphone signal $y^2(n)$ 1018 and the loudspeaker signal x(n) 1014 of the loudspeaker 1007. For example in FIG. 10, this output 1017 and $e^1(n)$ 1010 are input into the echo postfiltering block 1016 to give an echo suppressed signal $\hat{s}(n)$ 1019, which may also be understood as an estimate of the near-end speech signal s(n) 1004. It should be noted that the filter update block 1015 may be equal to filter update block 919 as shown in FIG. 9.

The circuit 1000 may for example correspond to the circuit 800 of FIG. 8.

Generally, the circuit 1000 may function in a similar manner as the circuit 900 of FIG. 9 with the except that only one adaptive filter 1001 is used in the circuit 1000. Using only one adaptive filter 1001 may reduce the computational complexity of the multi-channel echo postfilter.

The circuits 900, 1000 may be extended to multi-channel m. In multi-channels including a plurality of receiving paths.

In the following examples, frequency domain echo postfiltering is performed. In the SC case, frequency domain echo postfilters aim at estimating the near-end speech signal. To do so, a SC echo postfilters uses its input signals (loudspeaker and microphone signals) to compute an attenuation gain. This attenuation gain is then applied to the microphone path in the frequency domain to completely suppress the residual echo.

In the circuits 900, 1000, the echo suppression is only applied to the primary microphone path. This means existing SC echo suppression gain rules may still be used. The computation of a gain rule may generally require estimates of the residual echo PSD and of the near-end PSD. For example, the following gain rules may be used:

$$W_1(k, i) = \frac{\Phi^{S_P S_P}(k, i)}{\Phi^{S_P S_P}(k, i) + \Phi^{\tilde{D}_P \tilde{D}_P}(k, i)} \quad \text{Eq (7)}$$

$$W_2(k, i) = \frac{SER(k, i)}{1 + SER(k, i)} \quad \text{Eq (8)}$$

where $\Phi^{S_P S_P}(k,i)$ is the PSD of the near-end speech, $\Phi^{\tilde{D}_P \tilde{D}_P}(k,i)$ is the PSD of the residual echo at the primary microphone (present in $e_p$) and $$SER(k, i) = \frac{\Phi^{S_P S_P}(k, i)}{\Phi^{\tilde{D}_P \tilde{D}_P}(k, i)}$$

is the signal-to-echo ratio (SER) at the primary microphone.

The above equations are mathematically equivalent. Nevertheless their practical implementation does not necessarily lead to the same results and speech quality. This is because means to estimate the PSDs or the SER are not necessarily mathematically equivalent. The SER can for example be computed through the Ephraim and Malah formalism as follows:

$$SER(k, i) = \beta \cdot \frac{|S_1(k, i)|^2}{\Phi^{\tilde{D}_1 \tilde{D}_1}(k, i)} + (1 - \beta) \cdot \max[SER_{post}(k, i), 0] \quad \text{Eq (9)}$$

$$SER_{post}(k, i) = \frac{|E_1(k, i)|^2}{\Phi^{\tilde{D}_1 \tilde{D}_1}(k, i)} - 1.$$

These equations give an example of SER estimation which only requires an estimate of the residual echo PSD and not the estimation of the residual echo and near-end PSDs as it is the case for $W_1(k,i)$.

As described above, power level differences between the receiving paths (of the primary and secondary microphone) can be observed depending on the active acoustic source (far-end speaker or near-end speaker). In the following, an example using a double talk detector (DTD) that exploits the PLD is used. This is illustrated in FIG. 11.

Figure 11:
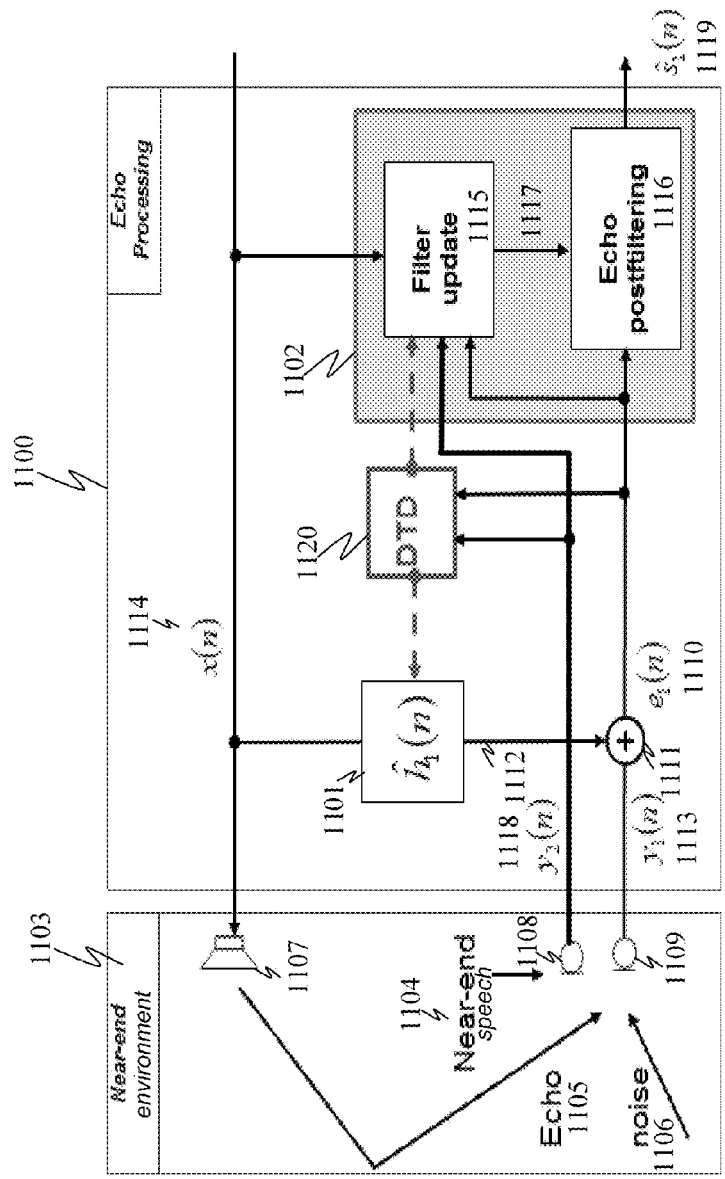
FIG. 11 shows an error cancellation circuit including a double-talk detector.

FIG. 11 shows an echo cancellation circuit 1100.

Similarly to the echo cancellation circuit 1000, the echo cancellation circuit 1100 receives audio signals from a system 1103, includes an adaptive filter 1101 and a postfilter 1102 with an filter update block 1115 and an echo postfiltering block 1116.

Further, the echo cancellation circuit 1100 includes a double talk detector 1120 which receives the error signal $e^1(n)$ and the secondary microphone signal $y^2(n)$ 1018 and performs double talk detection based on these signals. The double talk detector 1120 may also perform the determination of the PLD between these signals and may provide the PLD as well as the result of the double talk detection to the filter update block 1115 and/or the adaptive filter 1101 and thus control one or both of these modules.

Above, it has been shown that power level differences can be observed between the microphone signals in echo-only periods:

$$\Phi^{y_1 y_1}(k,i) << \Phi^{y_2 y_2}(k,i). \quad \text{Eq (10)}$$

Accordingly, in this example, the double talk detector 1120, after getting the PSDs of each microphone signal, computes a measure of the PLD and uses it for the DTD. The PLD $\Delta\Phi_{PLD}(k,i)$ can be obtained through different ways:

Given the explanations about the level difference between the microphone signals a PLD can be defined as follows:

$$\Delta\Phi_{PLD}(k,i) = \Phi^{y_1 y_1}(k,i) - \Phi^{y_2 y_2}(k,i) \quad \text{Eq (11)}$$

An alternative PLD can be defined as:

$$\Delta\Phi_{PLD}(k,i) = \Phi^{y_1 y_1}(k,i) - \text{BiasComp} \times \Phi^{y_2 y_2}(k,i) \quad \text{Eq (12)}$$

This PLD includes an additional parameter BiasComp which enables compensating for any bias or mismatch that could exist in between the gain of each microphone in hardware. Thus, BiasComp is a scaling factor used to amplify or attenuate the secondary microphone channel.
A normalized version of this PLD can be defined as $$\Delta\Phi_{PLD}(k,i) = \frac{\Phi^{y_1 y_1}(k,i) - \Phi^{y_2 y_2}(k,i)}{\Phi^{y_1 y_1}(k,i) + \Phi^{y_2 y_2}(k,i)} \quad \text{Eq (13)}$$

This PLD definition has values between −1 and +1. The normalization permits to avoid been dependent of the speaker voice level or of the loudspeaker signal level and volume. Another variant of this normalized PLDs can be defined by using bias compensator as in the alternative PLD above.

Further, the PLD may be defined between the error signal from the AEC and the secondary microphone. The level difference between the primary and secondary microphone paths is even more emphasized if it is measured after the adaptive filtering, assuming the AEC does not amplify the echo we can better focus on DT periods:

$$\Phi^{e_1 e_1}(k,i) \leq \Phi^{y_1 y_1}(k,i) \Rightarrow \Phi^{e_1 e_1}(k,i) << \Phi^{y_2 y_2}(k,i) \quad \text{Eq (14)}$$

Given this observations, the normalized PLD (NPLD) can be alternatively defined in the frequency domain as follows:

$$\Delta\Phi_{PLD}(k,i) = \frac{\Phi^{e_1 e_1}(k,i) - \Phi^{y_2 y_2}(k,i)}{\Phi^{e_1 e_1}(k,i) + \Phi^{y_2 y_2}(k,i)}. \quad \text{Eq (15)}$$

The AEC aims at cancelling the echo signal picked up by the primary microphone. It results from this that the power of the error signal $\Phi^{e_1 e_1}(k,i)$ is necessarily lower or equal to that of microphone signal $\Phi^{y_1 y_1}(k,i)$. The PLD as defined in the above equation is normalized (i.e. has values between −1 and +1) and takes advantage of the AEC to emphasize even more the power difference between the secondary and primary microphone paths.

In the following, the use of the PLD is explained based on the definition of equation (15). However, the other PLD definition as described above may also be used.

As mentioned above, the normalization permits to avoid being dependent on the speaker voice level and use a quantity which is included in between −1 and 1.

Figure 12:
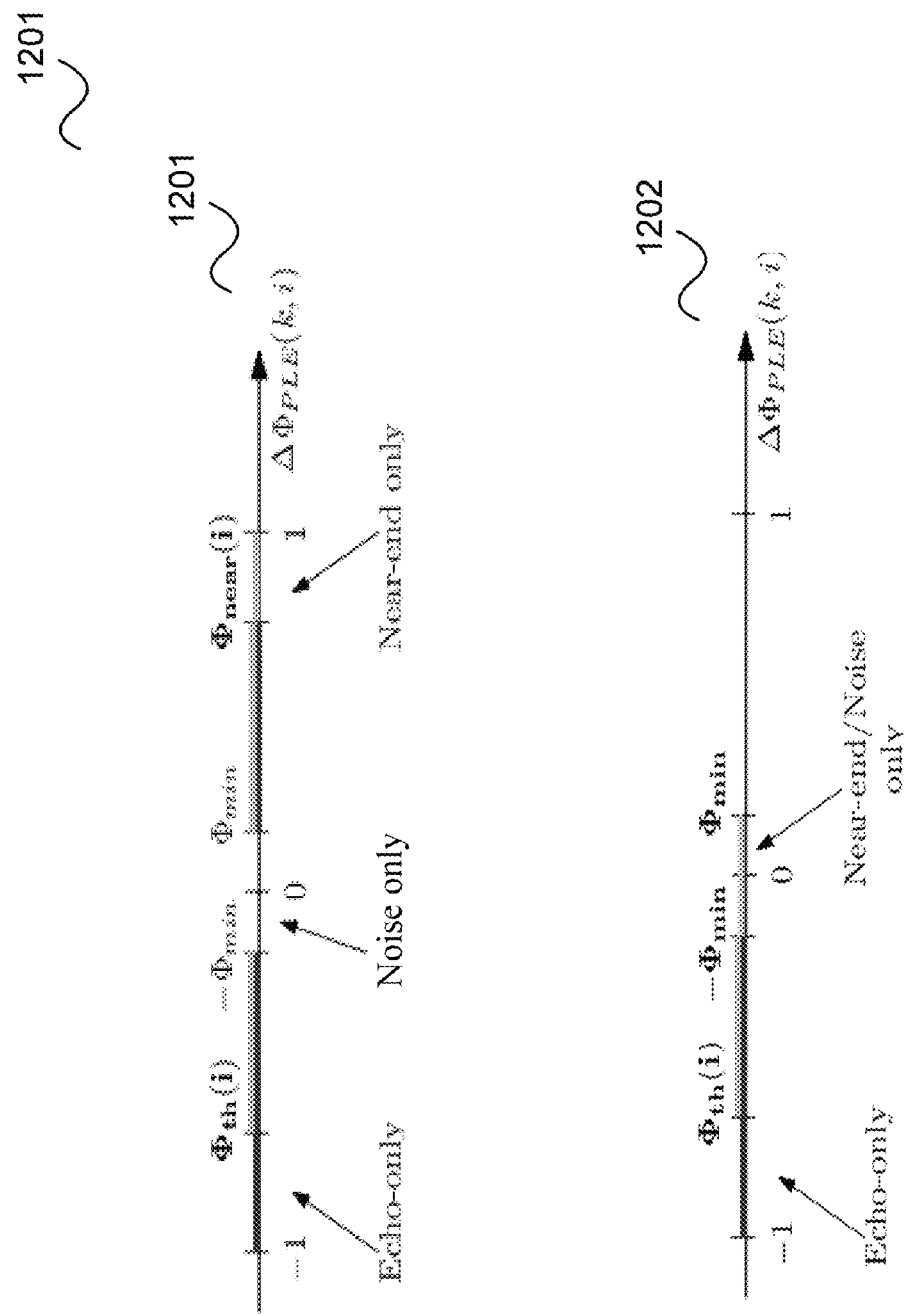
FIG. 12 shows diagrams illustrating the value distribution of the normalized power level difference (PLD).

The value distribution of the normalized PLD is illustrated in FIG. 12.

FIG. 12 shows diagrams 1201, 1201.

The first diagram 1201 illustrates the values of the normalized PLDs as defined above for the handset case.

The second diagram 1202 illustrates the values of the normalized PLDs as defined above for the handfree case.

Typical values of the PLD are summarized in Table 1.

TABLE 1

Typical values of the normalized PLD

|  | Echo-only | Double-talk | Near-end only | Noise or silence |
|---|---|---|---|---|
| Handset | −1 | 0 < \|Δ$\Phi_{PLD}$(k, i)\| < 1 | +1 | 0 |
| Handsfree |  | −1 < Δ$\Phi_{PLD}$(k, i) < 0 | 0 |  |

From this it can be seen that echo-only periods can be distinguished by applying a threshold on the PLD value:

$$\Delta\Phi_{PLD}(k,i) < \Phi^{th}(i) \Rightarrow \text{echo-only detected,}$$

$$(\Delta\Phi_{PLD}(k,i) \geq \Phi^{th}(i)) \& (\text{far-end speaker active}) \Rightarrow$$
$$\text{double-talk detected} \quad \text{Eq (16)}$$

where $\Phi^{th}(i)$ is a threshold.

The threshold $\Phi^{th}(i)$ is for example chosen to be between −0.9 and −0.99. The threshold must not necessarily have the same value for all frequency bins or bands. Far-end speech activity can be detected using any conventional speech activity detector. One simple speech activity detector consists in thresholding the loudspeaker energy.

Double-talk detection can be used to improve speech quality output. For example, the double talk detector 1120 operates as a control module which can be used for the AEC and/or the echo postfiltering.

The information about the result of the double talk detection may for example be used within the adaptive (AEC) filter 1101 to freeze the adaptation when double-talk is detected, i.e. setting the step-size (which can be variable or fix) μ(n) to 0. In this example, the double talk detector 1120 operates in the frequency domain. Nevertheless, alternative double-talk detection can be performed based on the PLD by making the double-talk decision for a group of frequency or frequency band. The following equation is an example for an alternative decision making based on the PLD:

$$\frac{1}{N}\sum_{i}^{N}\Delta\Phi_{PLD}(k,i) \geq \Phi^{th} \quad \text{Eq (17)}$$

$$\Rightarrow \text{double-talk or near-end only detected and } \mu(n) = 0$$

where N represents a group of frequency bins or frequency band of interest.

This alternative DT decision could also be of interest to make a correspondence between the time-frequency resolution of the PLD which might be different from that of the AEC. Lastly, far-end speech activity can be detected through any speech activity detector. One simple speech activity detector consists in thresholding the loudspeaker energy.

Double-talk can be distinguished from near-end periods with the use of speech activity detection on the reference line or loudspeaker signal. Frequency band based decision could also be of interest to make a correspondence between the PLD time-frequency resolution which might be different from that of the AEC or postfiltering.

As illustrated in FIG. 11, the double talk detector 1120 can be used to control echo postfiltering. For example, the echo suppression gain may be postprocessed (after it has been updated according the formalism of our choice) by setting it to its minimum value during echo-only periods $$\text{if } \Delta\Phi_{PLD}(k,i)<\Phi^{th} \text{ then } W(k,i)=W_{min}. \quad \text{Eq (18)}$$

This permits achieving maximum echo suppression during echo-only periods. A more indirect modification/improvement of the echo postfilter may also be used by updating variables such as the echo PSD required in the computation. For example, during echo-only periods, the echo PSD $\Phi^{d_1 d_1}(k,i)$ is set to be equal to the error signal PSD:

$$\text{if } \Delta\Phi_{PLD}=(k,i)<\Phi^{th} \text{ then } \Phi^{d_1 d_1}(k,i)=\Phi^{e_1 e_1}(k,i). \quad \text{Eq (19)}$$

The echo PSD estimate may be weighted with an overestimation factor which aims at compensating for estimation errors. High values of overestimation factors lead to high echo suppression and high near-end speech distortions while small values lead to the opposite effects. With the frequency domain based double talk detection, a two-step overestimation factor γ can be defined. It may then be switched between the two values depending on whether there is currently an echo-only or a double talk period:

$$\text{if } \Delta\Phi_{PLD}(k,i)<\Phi^{th} \text{ then } \gamma=\gamma_{echo}.$$

$$\text{otherwise if } \Delta\Phi_{PLD}(k,i)\geq\Phi^{th} \text{ then } \gamma=\gamma_1. \quad \text{Eq (20)}$$

with $\gamma_{echo}>\gamma_1$.

The main limitations of hard decision systems such as the hard decision based on the double talk detection as described above are typically the errors that are due to false positive (i.e. DT detected when this is not the case) and false negative (i.e. DT not detected when it is actually the case). This may be overcome with a soft decision approach.

The PLD measure introduced above can also directly be used for echo cancellation control i.e. without performing the double talk detection. Such usage of the PLD is referred to as soft decision control.

To illustrate how the PLD can be used in soft decision, it is first assumed that the PLD $\Delta\Phi_{PLD}(k,i)$ has values included between $\Delta\Phi_{PLD}^{min}(i)$ and $\Delta\Phi_{PLD}^{max}(i)$. The maximum and minimum values of the PLD depend on the PLD definition used and are chosen appropriately. For example, for the normalized PLDs, $\Delta\Phi_{PLD}^{min}(i)$ and $\Delta\Phi_{PLD}^{max}(i)$ could respectively be set to −1 and +1. The PLD could be used to control the adaptation of the AEC by defining the stepsize as a function of the PLD:

$$\mu(n) = f_1(\Delta\Phi_{PLD}(k, i)) \quad \text{Eq (21)}$$

such that $$\begin{cases} f_1(\Delta\Phi_{PLD}^{min}) = \mu_{max} \\ f_1(\Delta\Phi_{PLD}^{max}) = \mu_{min} \text{ or } 0 \end{cases}$$

where $f_1(.)$ is a function defined at the designer's convenience for example any monotonic and decreasing function of $\Delta\Phi_{PLD}(k,i)$. The echo PSD overestimation factor could also be monitored in a similar way as the stepsize:

$$\gamma(k, i) = f_2(\Delta\Phi_{PLD}(k, i)) \quad \text{Eq (22)}$$

such that $$\begin{cases} f_2(\Delta\Phi_{PLD}^{min}) = \gamma_{echo} \\ f_2(\Delta\Phi_{PLD}^{max}) = \gamma_1 \text{ with } \gamma_{echo} > \gamma_1 \end{cases}$$

Figure 13:
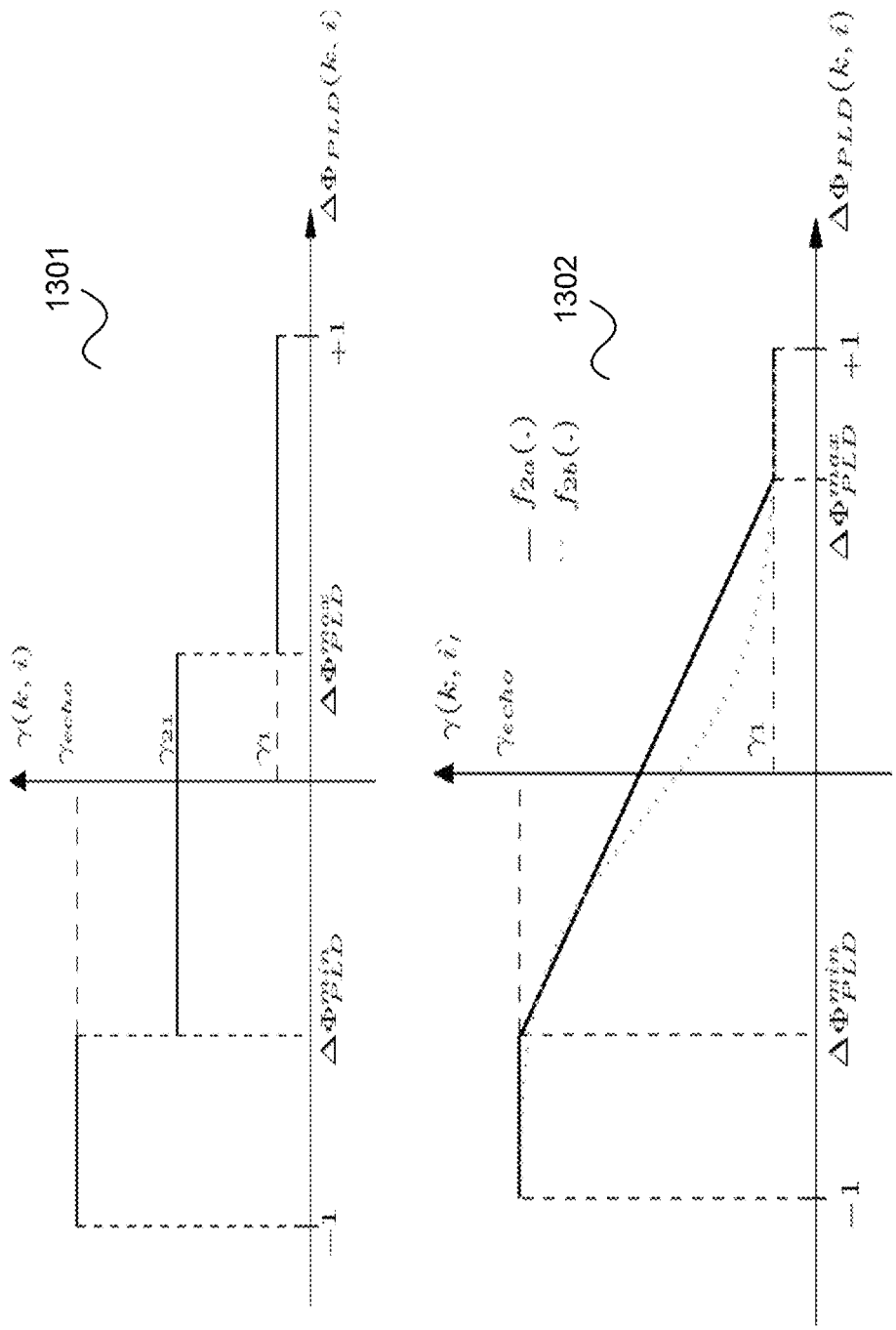
FIG. 13 shows diagrams given examples of overestimation factor setting functions.

The control function $f_2(.)$ is for example a monotonic and decreasing function of $\Delta\Phi_{PLD}(k,i)$. Examples of control functions are shown in FIG. 13. A typical usage of such control within products could for example to define $f_2(.)$ as a piecewise defined function.

FIG. 13 shows diagrams 1301, 1302 giving examples of overestimation factor setting functions $f_2(.)$.

The first diagram 1301 illustrates a first example for the control function $f_2(.)$ according to which the overestimation factor decreases in two steps between −1 and 1.

The second diagram 1302 illustrates a second example for the control function $f_2(.)$ according to which the overestimation factor decreases linearly in the region between $\Delta\Phi_{PLD}^{min}$ and $\Delta\Phi_{PLD}^{max}$.

The examples for the control functions in FIG. 13 are illustrated for the residual echo overestimation control. Nevertheless, similar functions can be used to control other quantities involved in the echo cancellation such as the stepsize or echo suppression gain. For proper control of stepsize of the AEC, this function may be chosen to be a monotonic and decreasing function of $\Delta\Phi_{PLD}(k,i)$. For the echo suppression gain, this function may be chosen to be a monotonic increasing function of $\Delta\Phi_{PLD}(k,i)$.

Above, it has been described how the level difference between the microphone signals can be used to detect double talk. Possible measures of this difference in the form of a PLD are described above. The above examples show how this PLD can be used to control and improve both the AEC and the residual echo suppression. For example, two control methods can be used. The PLD can be used to detect DT and the DTD output is then used to control the different modules and the PLD measure can directly be used to control the echo cancellation modules.

The PLD based control exploits the level difference observed in echo-only periods when the transducers are placed in bottom-top configuration. This means that the above approach is related to the position of the transducers on the terminals. Given a terminal, it may be ensured that the maximum PLD occurs during echo-only periods. This is possible by suitably choosing the transducers position. For example, the secondary microphone is placed as close as possible from the loudspeaker so this microphone picks up the maximum power in echo-only periods. The primary microphone is for example placed as far as possible of the loudspeaker so as to have the minimum level transfer during echo-only periods. Such positioning of the transducers is typically optimal for the use of our PLD based DTD.

The double-talk detector 1120 can be operated in the frequency or subband domain as well as in the fullband domain. The subband or frequency domain approach may be advantageous for detecting specific frequencies or subbands where double-talk occurs. The double talk detector 1120 offers flexibility as it can be used in the echo postfilter as well as the adaptive filter. The fact that the double talk detector 1120 operates in frequency or subband domain permits to avoid even more half-duplex communications effects that can be created by a fullband double talk detector 1120. By targeting specific double-talk frequencies the double talk detector 1120 can help to reduce near-end speech distortions introduced by the postfilter 1116 while maintaining or even improving the suppression of the residual echo. The double talk detector can also be used to monitor the AEC even in case the AEC uses a variable stepsize. This helps to avoid divergence of the adaptive filter.

Nevertheless, in some echo processing schemes the AEC and postfilter may not operate in the same frequency or subband domain. In such circumstances, the link between the different resolutions may be made by considering ranges or a group of frequency bins.

The DTD approach described above is compatible with single microphone echo processing schemes. For example, for a communication device equipped with two microphones and an echo processing using only one of them the DTD approach described above may be easily implemented and can be used to improve existing echo processing modules (AEC and postfiltering). Thus, the DTD permits to gain advantage of the dual-microphone hardware architecture without necessarily changing the whole echo processing scheme.

In addition or alternatively to the above PLD-based double talk detection, a power level difference based echo postfilter may be used (e.g. as the filter update 1115). For this, an echo suppression gain rule may be used that is based on the PLD and uses relative transfer functions (RTFs) for which estimation rules are given below. The gain rule described in the following does not require an estimate of the echo power spectral density (PSD), leading to a reduced computational complexity. For the post filtering, the PLD may be used as a control parameter for the echo suppression gain, the residual echo PSD and/or the overestimation factor.

In the following, an example for power level difference gain rule for echo postfiltering is given in which two microphone signals are used instead of one for the computation of the echo postfiltering gain rule. In the following, two PLDs are introduced which may be used to compute the echo suppression gain.

Signals equations at the postfilter:
a) Input signals equations in the time domain $$e_1(n)=g_1(n)*s(n)+\tilde{d}_1(n)=g_1(n)*s(n)+\tilde{h}_1(n)*x(n)$$

$$y_2(n)=g_2(n)*s(n)+d_2(n)=g_2(n)*s(n)+h_2(n)*x(n) \quad \text{Eq (23)}$$

where $\tilde{h}_1(n)=h_1(n)-\hat{h}_1(n)$ represents the echo path misalignment vector.

b) Input signals in the frequency domain $$E_1(k,i)=G_1(k,i)\cdot S(k,i)+\tilde{H}_1(k,i)\cdot X(k,i)$$

$$Y_2(k,i)=G_2(k,i)\cdot S(k,i)+H_2(k,i)\cdot X(k,i) \quad \text{Eq (24)}$$

where:
$E_1(k,i)$ $Y_2(k,i)$ the Fourier transform of the error signal of the primary and secondary microphone respectively
k and i respectively represent the frame and frequency bin indexes In the following, the frame and frequency indexes will be omitted for clarity purposes and will only be used when necessary.

c) Residual Echo Signals Auto- and Cross-PSDs
Assuming loudspeaker signal and the near-end speech signal are uncorrelated (i.e. their cross-PSD is null $\Phi^{xs}=0$), the following holds:

$$\Phi^{e_1e_1}=|G_1|^2\cdot\Phi^{ss}+|\tilde{H}_1|^2\cdot\Phi^{xx}$$

$$\Phi^{y_2y_2}=|G_2|^2\cdot\Phi^{ss}+|H_2|^2\cdot\Phi^{xx} \quad \text{Eq (25)}$$

where:
$\Phi^{ss}$ and $\Phi^{xx}$ respectively stand for the near-end speech signal and the loudspeaker auto-PSDs.

Two RTFs $\Gamma$ and $\Theta$ are defined as follows $$\Gamma = \frac{H_2}{\tilde{H}_1}, \quad \Theta = \frac{G_2}{G_1}. \quad \text{Eq (26)}$$

Rewriting equation (25) with the above RTFs gives $$\Phi^{e_1e_1}=|G_1|^2\cdot\Phi^{ss}+|\tilde{H}_1|^2\cdot\Phi^{xx}$$

$$\Phi^{y_2y_2}=|\Theta\cdot G_1|^2\cdot\Phi^{ss}+|\Gamma\cdot\tilde{H}_1|^2\cdot\Phi^{xx} \quad \text{Eq (27)}$$

d) Power Level Differences
For this, two PLD quantities (measures) are defined as follows:

$$\text{echo\_PLD}=|\Theta|^2\cdot\Phi^{e_1e_1}-\Phi^{y_2y_2}=(|\Theta|^2-|\Gamma|^2)\cdot\Phi^{\tilde{d}_1\tilde{d}_1}$$

$$\text{near\_PLD}=\Phi^{y_2y_2}-|\Gamma|^2\cdot\Phi^{e_1e_1}=(|\Theta|^2-|\Gamma|^2)\cdot\Phi^{s_1s_1} \quad \text{Eq (28)}$$

The Wiener echo postfilter gain can be written as $$W = \frac{\Phi^{s_1s_1}}{\Phi^{s_1s_1}+\gamma\cdot\Phi^{\tilde{d}_1\tilde{d}_1}} \quad \text{Eq (29)}$$

where $\gamma$ is an overestimation factor. This gain rule can be rewritten with the PLD measures defined above as follows:

$$W = \frac{\text{near\_PLD}}{\text{near\_PLD}+\gamma\cdot\text{echo\_PLD}} \quad \text{Eq (30)}$$

In a real time implementation, the computation of such gain rule only requires the estimation of the relative transfer functions (RTFs) $\Gamma$ and $\Theta$. Some approaches to estimate the RTFs are presented in the next the following. The required PSDs can be computed through autoregressive smoothing from the input microphone signals.

Most popular methods to estimate RTF include cross-spectral method, mean square or least square error minimization.

a) Near-End Speech Acoustic Paths RTF Estimation
The near-end speech acoustic paths $\Theta$ is defined as $$\Theta = \frac{G_2}{G_1}. \quad \text{Eq (31)}$$

G can also be interpreted as a gain such that $$S_2=\Theta\cdot S_1 \quad \text{Eq (32)}$$

Considering near-end only speech activity period (i.e. $E_1=S_1=G_1\cdot S$ and $Y_2=S_2=G_2\cdot S$), an estimate $\hat{\Theta}$ of $\Theta$ can be obtained through mean square error (MSE) or least square error (LSE) minimization.

The minimum MSE (MMSE) criteria used for the derivation of the MMSE estimate of $\hat{\Theta}$ is $$\hat{\Theta}_{MMSE} = \underset{\hat{\Theta}}{\text{argmin}}\left(|S_2-\hat{S}_2|^2\right) \quad \text{Eq (33)}$$

with $$\hat{S}_2 = \hat{\Theta}\cdot S_1.$$

The MMSE estimate of $\hat{\Theta}$ is then given by $$\hat{\Theta}_{MMSE} = \frac{\Phi^{s_1s_2}}{\Phi^{s_2s_2}} = \frac{\Phi^{e_1y_2}}{\Phi^{y_2y_2}}. \quad \text{Eq (34)}$$

Another estimate in the form of an adaptive filter can be derived from equation (33). In this case, one has many choices for the adaptive filter: LMS, NLMS or FBLMS. One should note that as the minimization criteria (equation (33)) is in the frequency domain using LMS or NLMS leads to an estimate in the frequency domain. The NLMS solution may be chosen as it is proved to give a quite stable and robust algorithm:

$$\hat{\Theta}_{NLMS}(k+1, i) = \hat{\Theta}_{NLMS}(k, i) + \mu \frac{E_1(k, i)}{\|E_1(k, i)\|^2} e(k, i) \quad \text{Eq (35)}$$

where:
$e(k,i) = Y_2(k,i) - \hat{Y}_2(k,i) = Y_2(k,i) - \hat{\Theta}_{NLMS}(k,i) \cdot Y_2(k,i)$ is the error signal $\mu$ is the stepsize which we set to a fixed value for the sake of simplicity.

The LSE minimization can also be used to estimate the near-end RTF $\hat{\Theta}$. The LSE estimate of $\Theta$ expresses as follows $$\hat{\Theta}_{LSE} = \frac{\langle \Phi^{e_1 e_1} \Phi^{e_1 y_2} \rangle - \langle \Phi^{e_1 e_1} \rangle \langle \Phi^{e_1 y_2} \rangle}{\langle (\Phi^{e_1 e_1})^2 \rangle - \langle \Phi^{e_1 e_1} \rangle^2}. \quad \text{Eq (36)}$$

where $$\langle \beta \rangle = \langle \beta(k, i) \rangle = \frac{1}{K} \sum_{k=1}^{K} \beta(k, i)$$

given a set of K measures of $\beta$ along time.

Details about the derivation of $\hat{\Theta}_{LSE}$ are presented further below.

In either case ($\hat{\Theta}_{MMSE}$, $\hat{\Theta}_{NLMS}$ or $\hat{\Theta}_{LSE}$), the update is performed during near-end only activity period. An activity detection on the loudspeaker permits to detect near-end only activity periods. For example, this activity detection is achieved by applying a threshold on the loudspeaker and microphone signals energies. The threshold on the loudspeaker energy permits to avoid adaptation during far-end activity periods whereas the threshold on the microphone signals permits to avoid adaptation during near-end silence period or on low amplitude microphone signal.

b) Echo Paths RTF Estimation $\Gamma$ is defined as the ratio between the primary and the secondary residual echo paths $$\Gamma = \frac{\tilde{H}_2}{\tilde{H}_1} \quad \text{Eq (37)}$$

Similarly to $\Theta$ in the equations above, $\Gamma$ defines the link between the residual echo of primary and secondary microphone in the following manner $$\tilde{D}_2 = \Gamma \cdot \tilde{D}_1 \quad \text{Eq (38)}$$

Introducing this into in equation (24) the following is obtained $$E_1 = G_1 \cdot S + \tilde{H}_1 \cdot X = S_1 + \tilde{D}_1$$

$$Y_2 = G_2 \cdot S + H_2 \cdot X = S_2 + \Gamma \cdot \tilde{D}_2 \quad \text{Eq (39)}$$

Using the fact that $\tilde{D}_2$ and $\tilde{D}_1$ are both generated by the loudspeaker signal x(n), $\Gamma$ can be estimated through the cross-correlation. Assuming independence of loudspeaker and near-end speech signals (i.e. $\Phi^{xs}=0$), the cross-correlation estimator of $\Gamma$ can be expressed as follows $$\hat{\Gamma}_{CC} = \frac{\Phi^{xy_2}}{\Phi^{xe_1}} \quad \text{Eq (40)}$$

where $\Phi^{xe_1}$ and $\Phi^{xy_2}$ are the cross-correlation between the loudspeaker and error signal on the primary and the secondary microphone signal respectively and are given as follows $$\Phi^{xe_1} = \tilde{H}_1 \cdot \Phi^{xx}$$

$$\Phi^{xy_2} = H_2 \cdot \Phi^{xx} \quad \text{Eq (41)}$$

The least square can also be used to derive an estimate of the echo RTF $\Gamma$. In this case the minimization criterion writes as follows $$\hat{\Gamma} = \underset{\hat{\Gamma}}{\operatorname{argmin}} \left( \sum |D_2 - \hat{D}_2|^2 \right). \quad \text{Eq (42)}$$

The LS estimate of $\Gamma$ expresses as follows $$\hat{\Gamma}_{LS} = \frac{\langle \Phi^{xy_2} \Phi^{xe_2} \rangle}{\langle (\Phi^{xe_1})^2 \rangle} \quad \text{Eq (43)}$$

Its derivation is presented further below. It should be noted that $\hat{\Gamma}_{LS}$ and $\hat{\Gamma}_{CC}$ are if only one time frame is consider for the least square criterion minimization.

Above, it has been shown how the PLD can be exploited for echo processing in a dual-channel terminals. Given the fact that the position of the transducers has an influence on the PLD, one could be interested in finding the best position for the transducers. As discussed above the best position here would be the one offering the maximum PLD between microphone signals.

The echo processing scheme described above aims at cancelling the echo captured by the primary microphone. On this point of view, the primary microphone should be placed as far as possible from the loudspeaker while keeping it as closed as possible from the mouth of near-end speaker. Positioning the primary microphone with these constraints permits to keep the SER quite high. High SER signals are advantageous for echo cancellation performance. The echo cancellation approaches discussed above exploit the PLD between the two microphone signals. Therefore, to maximize this PLD the secondary microphone may be placed as closed as possible to the loudspeaker such that it can capture a high level echo signal. The only drawback is that saturation is very likely to occur on the secondary microphone and this is a non-linearity which may be taken into account.

In the following, a communication terminal equipped with one loudspeaker and M microphones is considered. Each microphone records both the echo signal which is generated by the loudspeaker, and the near-end speech signal. The signal on the $m^{th}$ microphone signal can be written as follows $$y_m(n) = g_m(n) * s(n) + h_m(n) * x(n) \quad \text{Eq (44)}$$

where
- $y_m(n)$ is the signal picked up by the $m^{th}$ microphone signal, wherein m ranges from 1 to M which is the number of microphones of the communication terminal. Each microphone signal contains an echo signal $d_m(n)$ and a near-end speech signal $s_m(n)$
- $h_m(n)$ is the acoustic path between the loudspeaker and $m^{th}$ microphone signal such that $d_m(n) = h_m(n) * x(n)$
- $\hat{h}_m(n)$ is the estimate of $h_m(n)$
- $e_m(n) = y_m(n) - \hat{d}_m(n)$ is the error signal from the adaptive filtering for the $m^{th}$ microphone signal. In case, only one adaptive filter is used as in FIG. 11, $e_m(n) = y_m(n)$ for $m \geq 2$.

$g_m(n)$ is the acoustic path between the near-end speaker and the $m^{th}$ microphone such that $s_m(n)=g_m(n)*s(n)$, $\hat{s}_1(n)$ is the output of the postfilter which is an estimate of the near-end speech.

As for the dual-channel case presented above (see FIG. 11), an adaptive filter can be used to estimate the echo signal picked up by the $m^{th}$ microphone. A multi-channel postfilter can take as inputs the loudspeaker signal and the microphone (or error for microphone path using an adaptive filter) signals.

In the following it is presented how the PLD can be used to derive a gain rule and DTD in the case of multi-microphone terminals.

For the multi-microphone PLD based gain rule, the multi-channel information is only used in the computation of the echo suppression while echo suppression itself takes place on the $m^{th}$ microphone path, meaning the postfilter gain can be expressed as follows $$W = \frac{\Phi^{s_m s_m}}{\Phi^{s_m s_m} + \gamma \cdot \Phi^{D_m D_m}}. \quad \text{Eq (45)}$$

In the derivation of the multi-channel PLD gain rule that follows, it is assumed that no adaptive filter is used on the microphone paths except for the mth microphone. This implies that input microphone signals are $y_m(n)$. Given the microphone observation $y_l(n)$ (with $l \neq m$), its Fourier transform can be written as follows $$Y_l = G_l \cdot S + H_l \cdot X. \quad \text{Eq (46)}$$

Assuming the loudspeaker and the near-end speech signals are uncorrelated (i.e. their cross-PSD is null $\Phi^{xs}=0$), the $l^{th}$ microphone auto-PSD can be expressed as follows:

$$\Phi^{y_l y_l} = \Phi^{s_l s_l} + \Phi^{d_l d_l} = |G_l|^2 \cdot \Phi^{ss} + |H_l|^2 \cdot \Phi^{xx} \quad \text{Eq (47)}$$

where l is the microphone channel index ranging from 1 to M. By introducing the RTFs defined as follows $$\Gamma^{m,l} = \frac{H_l}{H_m}, \quad \text{Eq (48)}$$

$$\Theta^{m,l} = \frac{G_l}{G_m}$$

in $$\Phi^{y_l y_l} = |\Gamma^{m,l}|^2 \cdot \Phi^{d_m d_m} + |\Theta^{m,l}|^2 \cdot \Phi^{s_m s_m}. \quad \text{Eq (49)}$$

is obtained. This equation shows the $l^{th}$ microphone auto-PSD can be written as a function of the echo signal and near-end signal PSDs of the $m^{th}$ microphone $\Phi^{d_m d_m}$ and $\Phi^{s_m s_m}$ which can be used to compute the echo suppression gain W as given above. Two PLD quantities (measures) are defined as follows:

$$\text{near\_PLD}^{m,l} = \Phi^{y_l y_l} - |\Gamma^{m,l}|^2 \cdot \Phi^{y_m y_m} = (|\Theta^{m,l}|^2 - |\Gamma^{m,l}|^2) \cdot \Phi^{s_m s_m} \quad \text{Eq (50)}$$

$$\text{echo\_PLD}^{m,l} = |\Theta^{m,l}|^2 \cdot \Phi^{y_m y_m} - \Phi^{y_l y_l} = (|\Theta^{m,l}|^2 - |\Gamma^{m,l}|^2) \cdot \Phi^{d_m d_m} \quad \text{Eq (51)}$$

The near- and echo-PLDs defined in these equations are functions of the echo and near-end PSD required for the echo suppression gain computation. Considering all the M microphone signals, the near-end PLD can equivalently be written in a matrix form as follows $$\begin{bmatrix} \text{near\_PLD}^{n,1} \\ \text{near\_PLD}^{n,2} \\ \vdots \\ \text{near\_PLD}^{n,M} \end{bmatrix} = \begin{bmatrix} |\Theta^{m,1}|^2 - |\Gamma^{m,1}|^2 \\ |\Theta^{m,2}|^2 - |\Gamma^{m,2}|^2 \\ \vdots \\ |\Theta^{m,M}|^2 - |\Gamma^{m,M}|^2 \end{bmatrix} \cdot \Phi^{s_m s_m} \quad \text{Eq (51)}$$

$$Z = A \cdot \Phi^{s_m s_m} \quad \text{Eq (52)}$$

With the following notations $$Z = [\text{near\_PLD}^{n,1} \quad \text{near\_PLD}^{n,2} \quad \ldots \quad \text{near\_PLD}^{n,M}]^T,$$

$$A = \begin{bmatrix} |\Theta^{m,1}|^2 - |\Gamma^{m,1}|^2 \\ |\Theta^{m,2}|^2 - |\Gamma^{m,2}|^2 \\ \vdots \\ |\Theta^{m,M}|^2 - |\Gamma^{m,M}|^2 \end{bmatrix}.$$

an estimate of the near-end PSD can be derived from the above matrix formulation as $$\hat{\Phi}^{s_m s_m} = (A^H A)^{-1} A^H Z. \quad \text{Eq (54)}$$

The expansion of this equation leads to the following $$\hat{\Phi}^{s_m s_m} = \frac{\sum_{l=1, l \neq m}^{M} (|\Theta^{m,l}|^2 - |\Gamma^{m,l}|^2) \cdot \text{near\_PLD}^{n,l}}{\sum_{l=1, l \neq m}^{M} (|\Theta^{m,l}|^2 - |\Gamma^{m,l}|^2)^2} \quad \text{Eq (55)}$$

Similarly, an estimate of the required echo PSD can be derived and expresses as follows:

$$\hat{\Phi}^{d_m d_m} = \frac{\sum_{l=1, l \neq m}^{M} (|\Theta^{m,l}|^2 - |\Gamma^{m,l}|^2) \cdot \text{echo\_PLD}^{n,l}}{\sum_{l=1, l \neq m}^{M} (|\Theta^{m,l}|^2 - |\Gamma^{m,l}|^2)^2} \quad \text{Eq (56)}$$

By introducing these two equations into the above formula for the post-processing gain, a new expression for the echo suppression can be derived:

$$W = \frac{\sum_{l=1, l \neq m}^{M} (|\Theta^{m,l}|^2 - |\Gamma^{m,l}|^2) \cdot \text{near\_PLD}^{n,l}}{\sum_{l=1, l \neq m}^{M} (|\Theta^{m,l}|^2 - |\Gamma^{m,l}|^2) \cdot (\text{near\_PLD}^{n,l} + \gamma \cdot \text{echo\_PLD}^{n,l})}. \quad \text{Eq (57)}$$

In the following, RTF estimation is discussed.

For a least square estimate of the near-end RTF, assuming near-end only activity periods and the presence of some local noise in the near-end acoustic environment, the $l^{th}$ microphone signal can be written as follows $$y_l(n) = g_l(n) * s(n) + b_l(n), \quad \text{Eq (58)}$$

or equivalently in the frequency domain $$Y_l = H_l \cdot X + B_l \quad \text{Eq (59)}$$

where $b_l(n)$ stands for the ambient noise received by the $l^{th}$ microphone and $B_l$ is its Fourier transform.

By introducing the near-end RTF definition as given in equation (48) into this equation $$Y_l = \Theta^{m,l} \cdot Y_m + B_l - \Theta^{m,l} \cdot B_m = \Theta^{m,l} \cdot Y_m + \tilde{B}_l \qquad \text{Eq (60)}$$

is obtained which resumes to an estimation problem. The least square estimate of the near-end RTF can be derived as $$\hat{\Theta}_{LS}^{m,l} = \frac{\langle \Phi_{(r)}^{y_m y_m} \Phi_{(r)}^{y_l y_m} \rangle - \langle \Phi_{(r)}^{y_m y_m} \rangle \langle \Phi_{(r)}^{y_l y_m} \rangle}{\langle (\Phi_{(r)}^{y_m y_m})^2 \rangle - \langle \Phi_{(r)}^{y_m y_m} \rangle^2} \qquad \text{Eq (61)}$$

where $$\langle \beta_{(r)} \rangle = \frac{1}{R} \sum_{k=1}^{R} \beta_{(r)}(k, i)$$

given a set of R measures of β along time.

For the least square estimate of the Echo RTF, assuming far-end activity periods and the presence of some local noise in the near-end acoustic environment, the $l^{th}$ microphone signal can be written as $$y_l(n) = h_l(n) * x(n) + b_l(n), \qquad \text{Eq (62)}$$

or equivalently in the frequency domain $$Y_l = H_l \cdot X + B_l \qquad \text{Eq (63)}$$

By introducing the echo RTF definition as defined in equation (48) into equation (63), the following is obtained:

$$Y_l = \Gamma^{m,l} \cdot Y_m + B_l - \Gamma^{m,l} \cdot B_m = \Gamma^{m,l} \cdot Y_m + \tilde{B}_l \qquad \text{Eq (64)}$$

Now the vector $[X\,Y_1\,\ldots\,Y_M]^T$ and an observation window which can be subdivided into R frames in the time domain are considered. Considering that the echo RTF is stationary within the observation window, non-stationary of speech signals from one frame to another can be exploited. For each frame r of the observation interval, the following PSD can be written $$\Phi_{(r)}^{y_l x} = \Gamma^{m,l} \cdot \Phi_{(r)}^{y_m x} + \Phi_{(r)}^{\tilde{b}_l x}. \qquad \text{Eq (65)}$$

$\tilde{B}_l$ is defined by the ambient noise in the near-end acoustic environment, therefore it can be assumed that it is statistically independent from the loudspeaker (i.e. $\Phi_{(r)}^{\tilde{b}_l x} = 0$). The quantities $\Phi_{(r)}^{y_l x}$ and $\Phi_{(r)}^{xx}$ can be estimated from observations signals through autoregressive smoothing for example. Considering the observation interval of R frames, this equation can be written in a matrix form as follows $$\begin{bmatrix} \Phi_{(1)}^{y_l x} \\ \Phi_{(2)}^{y_l x} \\ \vdots \\ \Phi_{(R)}^{y_l x} \end{bmatrix} = \begin{bmatrix} \Phi_{(1)}^{y_m x} \\ \Phi_{(2)}^{y_m x} \\ \vdots \\ \Phi_{(R)}^{y_m x} \end{bmatrix} \cdot [\Gamma^{m,l}] \qquad \text{Eq (66)}$$

$$Z = A \cdot V \qquad \text{Eq (67)}$$

Then the LS estimate of the echo RTF is as follows $$\hat{\Gamma} = \arg\min_{\hat{\Gamma}} \left( (Z - \hat{Z})^H \cdot (Z - \hat{Z}) \right) \qquad \text{Eq (68)}$$

with $$\hat{Z} = A \cdot \hat{V}$$

and can be expressed as $$\hat{\Gamma}_{LS}^{m,l} = (A^H A)^{-1} A^H Z \qquad \text{Eq (69)}$$

$$= \frac{\langle \Phi_{(r)}^{y_l x} \Phi_{(r)}^{y_m x} \rangle}{\langle (\Phi_{(r)}^{y_m x})^2 \rangle}$$

where $$\langle \beta_{(r)} \rangle = \frac{1}{R} \sum_{k=1}^{R} \beta_{(r)}$$

given a set of R measures of β along time.

For multi-microphone PLD based double-detection methods to achieve DTD based on the PLD may be used as for the dual-microphone case. In the following, an echo processing scheme composed of at least one AEC followed by a postfilter is considered that uses the M microphone signals or the error signal for a microphone path using an adaptive filter.

Similarly as in FIG. 11 a DTD can be used that uses all the microphone signals (or error signals for microphone paths using an adaptive filter) as inputs. Assuming the AEC and postfilter are applied to the $m^{th}$ microphone path, the normalized PLD can be defined as follows:

$$\Delta \Phi_{PLD}^{m,l} = \frac{\Phi^{e_m e_m} - \Phi^{y_l y_l}}{\Phi^{e_m e_m} + \Phi^{y_l y_l}}. \qquad \text{Eq (70)}$$

where l is the microphone channel index ranging from 1 to M and different from m. This equation defines M−1 PLDs which can be combined through fusion methods for DTD. For example, DTD could be based on only N microphone signals that offer the maximum level difference, with 0<N<M.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A method for processing an audio signal comprising: receiving a first audio signal via a first receiving path comprising a first microphone;
receiving a second audio signal via a second receiving path comprising a second microphone;
performing echo suppression of the first audio signal based on a comparison of the first audio signal and the second audio signal, comprising identifying an echo-only state in which the first and the second signals include substantially only respective echo-signals based on applying a threshold on a level difference between the first audio signal and the second audio signal.

2. The method of claim 1, further comprising receiving the one or more further audio signals via one or more further receiving paths and performing echo suppression of the first audio signal based on the first audio signal, the second audio signal and the one or more further audio signals.

3. The method of claim 2, wherein each further receiving path comprises a further microphone.

4. The method of claim 1, wherein the microphones are part of the same communication device.

5. The method of claim 1, wherein performing echo suppression of the first audio signal based on the first audio signal and the second audio signal comprises determining an echo suppression gain based on the first audio signal and the second audio signal and performing echo suppression of the first audio signal based on the determined echo suppression gain.

6. The method of claim 1, comprising determining a value representing the level difference between the first audio signal and the second audio signal and performing echo suppression of the first audio signal based on the value.

7. The method of claim 6, wherein the level difference is a power level difference, a voltage level difference or an energy level difference.

8. The method of claim 6, comprising comparing the level difference with the threshold and performing the echo suppression of the first audio signal based on the result of the comparison.

9. The method of claim 1, further comprising detecting a double-talk scenario based on the result of the comparison.

10. The method of claim 1, wherein performing echo suppression includes adaptive echo filtering.

11. The method of claim 10, wherein performing echo suppression of the first audio signal based on the first audio signal and the second audio signal includes setting the adaptation of the echo filtering based on the first audio signal and the second audio signal.

12. The method of claim 1, wherein performing echo suppression includes echo postfiltering.

13. The method of claim 1, wherein performing echo suppression of the first audio signal based on the first audio signal and the second audio signal comprises determining filter coefficients based on the second audio signal and filtering the first audio signal using the filter coefficients.

14. The method of claim 1, wherein performing echo suppression based on the first audio signal and the second audio signal comprises determining an echo suppression gain based on the first received audio signal and the second received audio signal and filtering echo suppression based on the first received audio signal and the echo suppression gain.

15. An audio receiving circuit comprising:
- a first receiving path comprising a first microphone configured to receive a first audio signal;
- a second receiving path comprising a second microphone configured to receive a second audio signal;
- an echo suppression circuit configured to perform echo suppression of the first audio signal based on a comparison of the first audio signal and the second audio signal, comprising identifying an echo-only state in which the first and the second signals include substantially only respective echo-signals based on applying threshold on level difference between the first audio signal and the second audio signal.

16. The audio receiving circuit of claim 15, comprising one or more further receiving paths configured to receive one or more further audio signals, wherein the echo suppression circuit is configured to perform echo suppression of the first audio signal based on the first audio signal, the second audio signal and the one or more further audio signals.

17. The audio receiving circuit of claim 16, wherein each further receiving path comprises a further microphone.

\* \* \* \* \*

UNITED STATES PATENT AND TRADEMARK OFFICE
CERTIFICATE OF CORRECTION

PATENT NO. : 9,100,466 B2
APPLICATION NO. : 13/892420
DATED : August 4, 2015
INVENTOR(S) : Christelle Yemdji et al.

Page 1 of 1

It is certified that error appears in the above-identified patent and that said Letters Patent is hereby corrected as shown below:

Claims:

Claim 15 - Column 24, line 20 delete "on applying threshold on" and write --on applying a threshold on-- in place thereof.

Signed and Sealed this
Twenty-first Day of June, 2016

Michelle K. Lee
*Director of the United States Patent and Trademark Office*